United States Patent
Tolosa et al.

(10) Patent No.: US 12,539,083 B2
(45) Date of Patent: Feb. 3, 2026

(54) ELECTRODE FABRICATION AND DESIGN

(71) Applicant: Neuralink Corp., San Francisco, CA (US)

(72) Inventors: Vanessa M. Tolosa, Emeryville, CA (US); Zachary M. Tedoff, Oakland, CA (US); Timothy L. Hanson, San Francisco, CA (US); Timothy J. Gardner, San Francisco, CA (US); Camilo A Diaz-Botia, Emeryville, CA (US); Supin Chen, San Ramon, CA (US)

(73) Assignee: Neuralink Corp., San Francisco, CA (US)

( * ) Notice: Subject to any disclaimer, the term of this patent is extended or adjusted under 35 U.S.C. 154(b) by 1263 days.

(21) Appl. No.: 16/569,584

(22) Filed: Sep. 12, 2019

(65) Prior Publication Data

US 2020/0085375 A1  Mar. 19, 2020

Related U.S. Application Data

(60) Provisional application No. 62/731,496, filed on Sep. 14, 2018.

(51) Int. Cl.
*A61B 5/00* (2006.01)
*A61B 5/293* (2021.01)

(52) U.S. Cl.
CPC ............ *A61B 5/6848* (2013.01); *A61B 5/293* (2021.01); *A61B 2562/125* (2013.01); *A61B 2562/164* (2013.01)

(58) Field of Classification Search
CPC .. A61N 1/0529; A61N 1/0534; A61N 1/0551; A61N 1/0539; A61N 1/0531;

(Continued)

(56) References Cited

U.S. PATENT DOCUMENTS 6,415,187 B1  7/2002  Kuzma et al.
9,782,229 B2  10/2017  Crawford et al.
(Continued)

FOREIGN PATENT DOCUMENTS

JP  2004202221 A  7/2004
JP  2004307857 A  11/2004
(Continued)

OTHER PUBLICATIONS

PCT/US2019/050858, "International Search Report and Written Opinion," Nov. 19, 2019, 8 pages.
(Continued)

*Primary Examiner* — Joseph A Stoklosa
*Assistant Examiner* — Brian M Antiskay
(74) *Attorney, Agent, or Firm* — Oblon, McClelland, Maier & Neustadt, L.L.P.

(57) ABSTRACT

Disclosed are biocompatible multi-electrode devices capable of being implanted in sensitive tissue, such as the brain, and methods for fabricating such arrays. The disclosed arrays can be implanted in living biological tissue with a single needle insertion. The devices can include linear arrays with contacts along an edge, linear arrays with multiple electrodes per opening in a parylene support layer, multi-thread electrode arrays, tree-like electrode arrays, and combinations thereof. In an embodiment, a compliant electrode apparatus can comprise a biocompatible and bio-implantable compliant dielectric having a top edge defined by a top and a side along a length of the dielectric, insulated electrical traces oriented along the length of the dielectric, and electrode contacts coupled to the traces and situated on the side along the length of the dielectric, wherein an exposed portion of a respective electrode contact protrudes beyond the top edge of the dielectric.

16 Claims, 22 Drawing Sheets

(58) Field of Classification Search
CPC .. A61N 1/3754; A61N 1/0543; A61N 1/0553; A61N 1/37514; A61N 1/04; A61N 1/0476; A61N 1/0472; A61N 1/3605; A61B 5/24; A61B 5/291; A61B 2018/00839; A61B 2562/125; A61B 5/6868; A61B 5/283; A61B 2562/164; A61B 2562/046; A61B 5/0006; A61B 5/369

USPC ............... 600/372–373, 377–379, 544–545; 607/115–118

See application file for complete search history.

(56) References Cited

U.S. PATENT DOCUMENTS

| | | | |
|---|---|---|---|
| 10,137,303 | B2* | 11/2018 | Greenberg ............ A61N 1/0531 |
| 2006/0128937 | A1 | 6/2006 | Nagasaki et al. |
| 2009/0299167 | A1* | 12/2009 | Seymour ................... A61B 5/24 600/372 |
| 2010/0168727 | A1 | 7/2010 | Hancock et al. |
| 2012/0296444 | A1 | 11/2012 | Greenberg et al. |
| 2013/0274596 | A1 | 10/2013 | Azizian et al. |
| 2013/0345780 | A1 | 12/2013 | Tabada et al. |
| 2014/0018639 | A1* | 1/2014 | Jamieson ............. A61B 5/4836 600/301 |
| 2014/0213891 | A1 | 7/2014 | Gilgunn et al. |
| 2014/0277317 | A1 | 9/2014 | Tooker et al. |
| 2014/0288458 | A1 | 9/2014 | Yoon et al. |
| 2014/0303703 | A1 | 10/2014 | Mercanzini et al. |
| 2015/0018622 | A1 | 1/2015 | Tesar et al. |
| 2015/0080740 | A1 | 3/2015 | Hao |
| 2015/0335257 | A1* | 11/2015 | Mcnaughton ............ A61N 1/05 607/116 |
| 2016/0278678 | A1 | 9/2016 | Valdes et al. |
| 2017/0112354 | A1 | 4/2017 | Dicarlo et al. |
| 2018/0014851 | A1 | 1/2018 | Hansen et al. |
| 2018/0078767 | A1 | 3/2018 | Rapoport et al. |
| 2018/0117309 | A1 | 5/2018 | Rapoport et al. |
| 2018/0153408 | A1 | 6/2018 | Yao et al. |
| 2018/0235659 | A1 | 8/2018 | Oostman, Jr. |
| 2018/0338765 | A1* | 11/2018 | Judy .................... A61L 31/028 |
| 2019/0022375 | A1* | 1/2019 | Cruttenden .......... A61N 1/0551 |

FOREIGN PATENT DOCUMENTS

| | | | |
|---|---|---|---|
| JP | 2006510416 | A | 3/2006 |
| JP | 2008056797 | A | 3/2008 |
| JP | 2015505678 | A | 2/2015 |
| JP | 2015523102 | A | 8/2015 |
| JP | 2015528713 | A | 10/2015 |
| WO | 2007089738 | A2 | 8/2007 |
| WO | 2007089738 | A3 | 8/2007 |
| WO | 2016126340 | A2 | 8/2016 |
| WO | 2016185525 | A1 | 11/2016 |
| WO | 2018102307 | A1 | 6/2018 |

OTHER PUBLICATIONS

PCT/US2019/050877, "International Search Report and Written Opinion," Dec. 5, 2019, 12 pages.
PCT/US2019/050886, "International Serach Report and Written Opinion," Feb. 5, 2020, 15 pages.
PCT/US2019/050886, International Preliminary Report on Patentability, Mar. 25, 2021, 12 pages.
PCT/US2019/050858, "International Preliminary Report on Patentability," Jul. 1, 2020, 16 pages.
PCT/US2019/050877, "International Preliminary Report on Patentability," Jul. 16, 2020, 6 pages.
Application No. EP19860686.5, Extended European Search Report, Mailed On Jun. 23, 2022, 11 pages.
Application No. JP2021-539469, Office Action, Mailed On Jun. 14, 2022, 11 pages.
Application No. JP2021-539469, Office Action, Mailed On Nov. 8, 2022, 5 pages.
Musk, Elon, An Integrated Brain-Machine Interface Platform with Thousands of Channels, Jul. 17, 2019 bioRxiv (retrieved from the Internet http://dx.doi.org/10.1101/703801).
Hanson, Timothy et al., The "Sewing Machine" for Minimally Invasive Neural Recording, Mar. 14, 2019 bioRxiv (retrieved from the Internet http://dx.doi.org/10.1101/578542).
Chan et al., "Implantable Polycrystalline Diamond Neural Probe for in Vivo and in Vitro Physiological Recording", Transducers 2009 : 2009 International Solid-State Sensors, Actuators and Microsystems Conference, Jun. 21, 2009, pp. 1202-1205.
EP19859297.4 , "Extended European Search Report", Mar. 25, 2022, 10 pages.
EP19859298.2 , "Extended European Search Report", Mar. 30, 2022, 7 pages.
EP19860686.5 , "Partial Supplementary European Search Report", Mar. 23, 2022, 13 pages.
Michon et al., "Integration of Silicon-Based Neural Probes and Micro-Drive Arrays for Chronic Recording of Large Populations of Neurons in Behaving Animals", Journal of Neural Engineering, Institute of Physics Publishing, vol. 13, No. 4, Jun. 28, 2016, 11 pages.
Application No. EP19859298.2, Office Action, Mailed On Jul. 28, 2023, 6 pages.
Application No. JP2021-539472, Office Action, Mailed On Jul. 25, 2023, 8 pages.
Application No. JP2021-539470, Office Action, Mailed On Jun. 27, 2023, 5 pages.
Application No. JP2021-539470, Office Action, Mailed On Jan. 16, 2024, 8 pages.
EP appln. No. 19859298.2, Intention to Grant, Apr. 22, 2024, 9 pages.
EP appln. No. 19860686.5, Office Action, Jul. 3, 2024, 6 pages.
"Office Action," mailed from the Canadian Patent Office on Mar. 7, 2024, in Application No. 3,112,749. 4 pages.
Office Action dated Feb. 4, 2025, issued in counterpart EP Application No. 19860686.5. (5 pages).
Office Action dated Oct. 9, 2025, issued in counterpart EP Application No. 19860686.5. (5 pages).

* cited by examiner

ELECTRODE FABRICATION AND DESIGN

CROSS-REFERENCES TO RELATED APPLICATIONS

This application claims the benefit of priority of U.S. Provisional Application No. 62/731,496 titled "Electrode Fabrication and Design" and filed on Sep. 14, 2018, which is herein incorporated by reference in its entirety for all purposes.

STATEMENT AS TO RIGHTS TO INVENTIONS MADE UNDER FEDERALLY SPONSORED RESEARCH AND DEVELOPMENT

Not Applicable

BACKGROUND

Implantable devices with electrodes can be used for recording and stimulating electrical signals in target biological tissue, such as the brain. However, during implantation the electrodes can damage or inflame the biological tissue, complicating the accurate study, diagnosis, and/or medical treatment of the tissue. Moreover, immune response as well as growth of the tissue around the implantation site may degrade the long term viability and stability of implanted electrodes.

In addition, conventional electrodes may not be configured to record and/or stimulate with precision at the depths required in some biological applications.

Further, due to their size and/or material composition, conventional electrodes used in implantable devices may be prone to breakage and may damage biological tissue when they break. As a result, conventional electrodes may be impractical for use in implantable devices.

BRIEF SUMMARY

Generally, disclosed herein are flexible, ribbon cable-like, microfabricated electrodes for implanting in biological tissue, such as a brain. They include electrodes with linear arrays of contacts along an edge, linear arrays with multiple electrodes per opening in a dielectric support layer, multi-thread electrode arrays, tree-like electrode arrays, electrode arrays with smaller recording/stimulating sites, electrode arrays with projections, and combinations thereof. The electrode arrays can have a biocompatible and bio-implantable compliant dielectric having a top edge defined by a top and a side along a length of the dielectric, insulated electrical traces oriented along the length of the dielectric, and electrode contacts coupled to the traces and situated on the side along the length of the dielectric, where an exposed portion of a respective electrode contact protrudes beyond the top edge of the dielectric.

The disclosed electrode arrays have improved biocompatibility and are able to record and/or stimulate target biological tissue with increased precision, and at greater depths within the tissue than conventional electrodes. Additionally, the disclosed electrode arrays have improved stability and resilience against mechanical strain and can be configured for long-term use within biological tissue. The micro-manufactured electrodes can be extremely small, thin, and flexible, thereby minimizing insertion wounds, allowing the target tissue to grow around the implanted electrodes, improving the proximity between the electrode contacts and the target sites, and allowing larger numbers of electrodes to be implanted.

In one aspect of this disclosure, a compliant electrode apparatus comprises a biocompatible, compliant dielectric having a top edge defined by a top and a side along a length of the dielectric. The compliant electrode apparatus further comprises electrical traces within the biocompatible dielectric and oriented substantially along the length of the dielectric, a respective electrical trace of the electrical traces insulated from a second electrical trace of the electrical traces. The compliant electrode apparatus further comprises electrode contacts situated on the side along the length of the biocompatible dielectric, wherein an exposed portion of a respective electrode contact protrudes beyond the top edge of the dielectric, and wherein the respective electrode contact is coupled to the respective electrical trace.

In some embodiments, the compliant electrode apparatus further comprises a reference electrode configured to read a reference signal from a fluid in a biological tissue, the reference electrode connected with one of the electrical traces.

In some embodiments, the electrode contacts include between 20 and 50 electrode contacts spaced along the length of the dielectric by between 45 micrometers and 55 micrometers center-on-center spacing. An area of each electrode contact is less than 350 square micrometers.

In some embodiments, the respective electrode contact has a substantially oval shape.

In some embodiments, the biocompatible dielectric comprises polyimide, and the electrical traces and the electrode contacts comprise gold or another metal.

In some embodiments, the biocompatible dielectric comprises one or more of: epoxy, polyparaxylylene, parylene, and acrylic.

In some embodiments, the compliant electrode apparatus further comprises an engagement component coupled to an end of the dielectric for detachably coupling to an insertion needle.

In some embodiments, a thickness of the dielectric is between 4 micrometers and 8 micrometers, and the length of the dielectric is between 15 millimeters and 25 millimeters.

In some embodiments, a bottom of the protruding, exposed portion of the respective electrode contact is covered with the dielectric.

In another aspect of this disclosure, a compliant electrode apparatus comprises a biocompatible compliant dielectric. The biocompatible compliant dielectric can have a plurality of branches branching from a stem structure. The bio-implantable compliant structure can further comprise electrode contacts situated on one or more branches of the plurality of branches. The bio-implantable compliant structure can further comprise electrical traces, a respective electrical trace at least partially situated within a respective branch, coupled to a respective electrode, and insulated from a second electrical trace.

In some embodiments, the plurality of branches comprises at least four flexible strands, and the electrode contacts are situated on the at least four flexible strands.

In some embodiments, the electrode contacts are situated at differing positions from one another along the at least four flexible strands.

In some embodiments, the stem structure of the biocompatible compliant dielectric includes a principal rod. The branches each comprise a secondary rod branching from the principal rod. The electrode contacts each are situated on the secondary rod branching from the principal rod.

In some embodiments, the electrode contacts are situated substantially at ends of the secondary rods. One or more of the secondary rods can branch at angles from the principal rod such that the electrode contacts are separated from the principal rod.

In some embodiments, the stem structure of the dielectric includes a compliant scaffold configured to fold during implantation.

In some embodiments, a maximum feature size of the electrode contacts is 10 micrometers, and an area of the respective electrode contact is less than 350 square micrometers.

In some embodiments, the electrode contacts comprise at least 20 electrode contacts.

In some embodiments, the biocompatible dielectric comprises polyimide and the electrical traces and the electrode contacts comprise gold or another metal.

In some embodiments, the biocompatible dielectric comprises one or more of: epoxy, polyparaxylylene, parylene, and acrylic.

In some embodiments, the biocompatible dielectric further comprises an engagement component at an end of the dielectric for detachably coupling to an insertion needle. The engagement component can comprise a loop with a length between 40 micrometers and 60 micrometers.

In another aspect of this disclosure, a method of fabricating a biocompatible compliant electrode apparatus comprises depositing a first layer of a biocompatible, compliant dielectric. The method further comprises depositing electrical traces on the first layer of the biocompatible, compliant dielectric such that the electrical traces are oriented substantially along a length of the dielectric, and a respective electrical trace of the electrical traces is insulated from a second electrical trace of the electrical traces. The method further comprises depositing electrode contacts on a side along the length of the biocompatible dielectric. The method further comprises depositing a second layer of the biocompatible, compliant dielectric over the first layer, electrical traces, and electrode contacts, leaving an exposed portion of a respective electrode contact so as to protrude beyond a top edge of the dielectric defined by a top and a side along the length of the dielectric, and wherein the respective electrode contact is coupled to the respective electrical trace.

In some embodiments, the method further comprises fabricating any of the electrode apparatuses described above.

In another aspect of this disclosure, a method of fabricating a biocompatible compliant electrode apparatus comprises forming registration marks on a surface, depositing a first layer of insulation on the surface, metallizing the surface, depositing a second layer of insulation on the surface, patterning an outline for the device on the surface, constructing a thread support layer on the surface, electroplating the current bus of the surface, and electroplating the bond pads on the surface. In an embodiment, depositing the first layer of insulation on the surface and metallizing the surface, can be repeated multiple times before continuing to depositing a second layer of insulation on the surface.

In some embodiments, depositing a first layer of insulation on the surface may include spin coating a layer of insulating materials (e.g., approximately 2 µm of polyimide) onto the surface, soft baking the surface on a hot plate, and curing the surface at low temperatures in a vacuum oven. In an embodiment, some or all of these steps can be repeated multiple times as needed.

In some embodiments, metallizing the surface may include spin coating a layer of resist (e.g., approximately 350 nm of resist (e.g., LOR3A)) on the surface, spin coating a layer of photoresist (e.g., approximately 420 nm of deep UV) on the surface, exposing the surface in a stepper tool with metal patterns, post-exposure baking the surface and developing the photoresist, descumming or ion mill etching the surface, placing the surface in an electron beam evaporator chamber, depositing a metal (e.g., platinum) onto the surface by electron beam evaporation, performing metal lift-off on the surface in a solvent bath, and performing a desalt on the surface. In an embodiment, some or all of these steps can be repeated multiple times as needed.

The disclosed electrode arrays may be fabricated using a process that enables higher resolution features. In particular, in some embodiments, the electrode arrays can be fabricated using stepper lithography, which can pattern a large number of electrodes onto the array. As a result, the electrode arrays can have small feature size while providing large electrode arrays with multiple recording/stimulation channels.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1A:
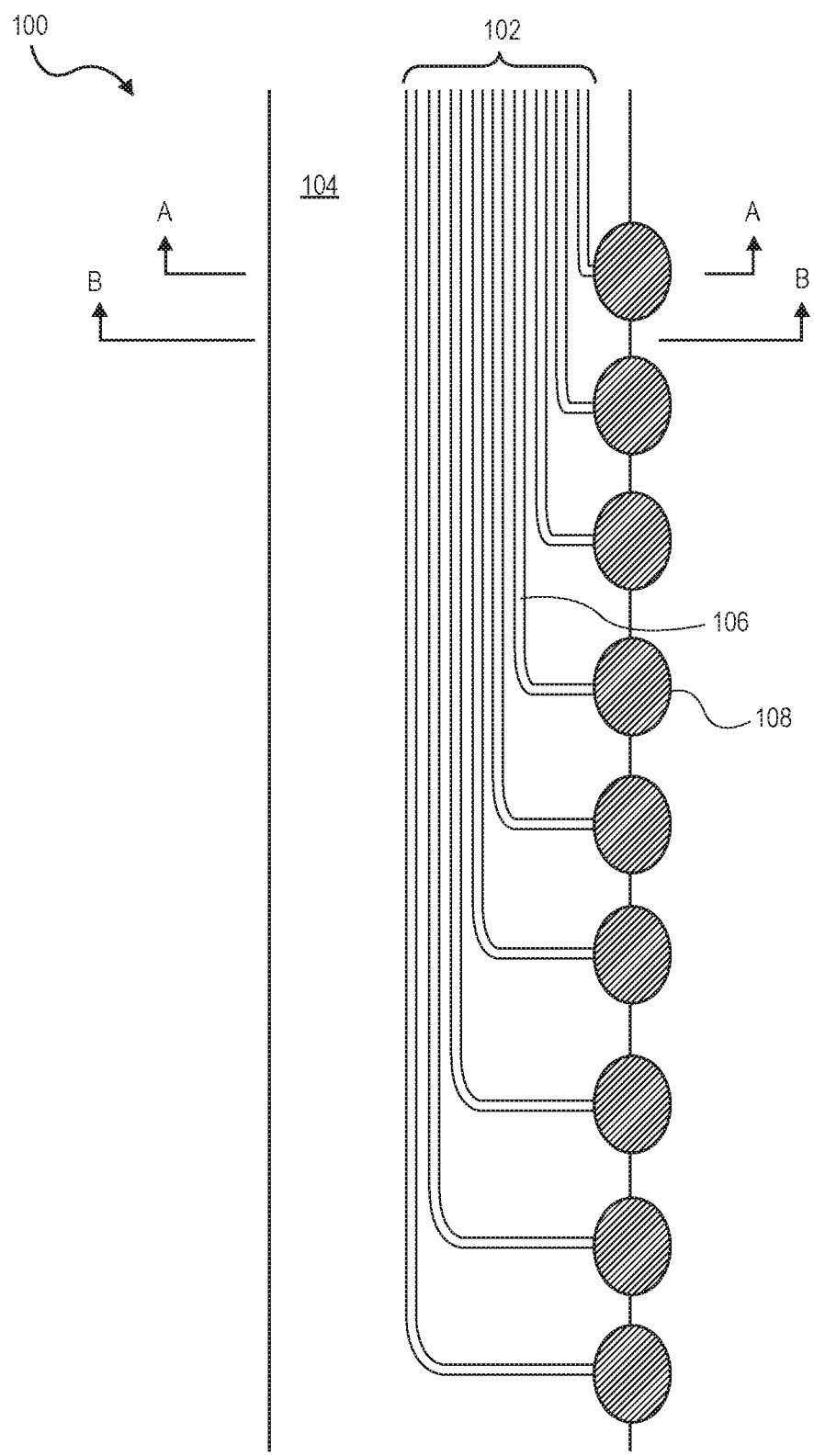
FIG. 1A illustrates a schematic top view of an electrode thread in a linear edge configuration, according to an embodiment.

The present disclosure describes various electrode arrays, which may be included within an implantable device, and methods for fabricating such electrode arrays. The disclosed implantable device may be configured for implantation in biological tissue, including sensitive living tissue, with a single needle insertion via a small insertion hole, yet can provide a plurality of electrodes for recording and/or stimulating electrical signals through such tissue. In particular, embodiments of the disclosed electrode arrays can have a small feature size (e.g., less than 10 micrometers (μm) maximum feature size, or characteristic size of the features fabricated on the contacts) while providing large electrode arrays, with multiple recording/stimulation channels, capable of extending beyond an insertion scar and surrounding a tissue site of interest. The combination of multiple electrode channels and the compliant, branched structure of the arrays allows the system to form detailed stereoscopic images of the target site.

Compared with conventional systems, the disclosed electrode arrays can record and/or stimulate with increased precision and at greater depths within biological tissue. In addition, the disclosed system and methods have improved biocompatibility and improved stability and resilience against mechanical strain, and can be configured for long-term use within biological tissue.

In a typical example, the disclosed system and methods may implant 96 polymer threads into neural tissue, each thread with 32 electrodes, for a total of 3,072 electrodes in the array. The electrodes are designed to be compact, thin, and flexible, with from 5 to 50 μm width and nominal thread thickness of 4 to 6 μm, including up to three layers of insulation and two layers of conductor. Typical thread length is approximately 20 mm. The extremely narrow thickness, small size, and increased flexibility of these probes offers greater biocompatibility, enabling the probes to remain implanted for long periods of time without triggering immune responses. The small thread cross-sectional area can also minimize tissue displacement in the target.

In a non-limiting example, the disclosed electrode arrays may be used with an implantable device configured to be implanted in a brain. In particular, one or more of the disclosed electrode arrays may be used to record and/or stimulate electrical signals through regions of the brain. The disclosed electrode arrays may be implanted within the brain at a greater depth than conventional systems, for example approximately two millimeters. In some embodiments, the disclosed electrode arrays may be configured to record action potentials, single neurons, multi-unit neuronal activity, and/or field potentials. In some embodiments, the disclosed electrode arrays can be configured to stimulate individual neurons, or a population of neurons.

In further examples, the disclosed system and methods may be used with biological tissue including, but not limited to: the brain, muscle, liver, pancreas, spleen, kidney, bladder, intestine, heart, stomach, skin, colon, etc. Additionally, the electrode arrays may be used in connection with any suitable multicellular organism including, but not limited to, invertebrates, vertebrates, fish, bird, mammals, rodents (e.g., mice, rats), ungulates, cows, sheep, pigs, horses, non-human primates, and humans. Moreover, the biological tissue may be ex vivo (e.g., a tissue explant), or in vivo (e.g., used within a surgical procedure performed on a patient, or as part of a brain-computer interface).

I. Electrode Configurations

FIGS. 1A-9 illustrate various electrode configurations. In various embodiments, many different thread and electrode types may be used in the electrode arrays, including those described in the examples of FIGS. 1A-9 as well as any other designs, and are not limited by the present disclosure. The threads may be fabricated with widths ranging from 5 to 50 μm, and may incorporate recording sites of several geometries, such as those described in the examples of FIGS. 1A-9 as well as other designs.

In an embodiment, the disclosed electrode array can include a bio-implantable compliant structure and multiple openings in a support layer, which may be made of parylene. The openings in the support layer can expose electrodes (also referred to as active sites) to allow recording and/or stimulating electrical signals. In some embodiments, the compliant structure includes a linear array of electrodes, as in the examples of FIGS. 1A-4 below. Alternatively, the compliant structure can include a plurality of branches branching from a stem structure and multiple electrodes situated on one or more of the plurality of branches, as in the examples of FIGS. 5-6 and 8-9 below.

In some embodiments, such a plurality of branches may wrap around an insertion needle to present a smaller cross-section during insertion into biological tissue, hence minimizing the insertion wound in the tissue. The branches can then be configured to splay upon removal of the insertion needle. A further feature of the branching structure is its ability to dissipate mechanical strain on the individual branches. Accordingly, the disclosed structures can provide technical advantages such as being less invasive to the target tissue, greater biocompatibility, and resilience against structural damage.

Each thin film array may be composed of a "thread" area that features electrode contacts and traces, and a "sensor" area where the thin film interfaces with custom chips that enable signal amplification and acquisition. In a typical embodiment, each array may have 48 or 96 threads, and each thread may contain 32 independent traces terminating in electrode contacts. A wafer-level microfabrication process enables high-throughput manufacturing of these devices. For example, ten thin film arrays may be patterned on a single wafer, each with 3,072 electrode contacts. In an example, each such array may be implanted via a single surgical bore in a patient's cranium. In various embodiments, any other numbers of arrays, devices, threads, traces, and/or contacts are possible, and are not limited by the present disclosure. Integrated chips are bonded to the contacts on the sensor area of the thin film using a flip-chip bonding process. This approach provides the technical advantage of maintaining a small thread cross-sectional area, in order to minimize tissue displacement in the brain. To achieve this, while keeping channel count high, stepper lithography and other microfabrication techniques may be used to form the metal film at sub-micron resolution.

The array can further include multiple electrical traces coupled to the electrodes and insulated from each other. In an embodiment, the electrode arrays can have a maximum feature size of 10 µm, and can have a typical scale of approximately 100 nanometers (nm) for the electrodes. In an embodiment, the electrical traces can have a typical scale of several hundreds of nanometers.

The maximum feature size may refer to a characteristic size of the features fabricated on the contacts.

The maximum feature size of 10 µm may improve the ability of cells in the target tissue to grow around the electrode array and/or communicate with one another, as well as providing mechanical buffering. Accordingly, the small size, flexibility, and diffuse geometry of the disclosed electrode arrays can provide a technical advantage by allowing the target neural tissue to grow more freely, while still allowing large numbers of electrodes, such as 3,072 electrodes per array, to be implanted. In addition, the disclosed system's flexibility and branching structure enable the electrode arrays to extend beyond an insertion wound and surround tissue sites of interest. These properties, such as the geometric configuration, size, shape, and flexibility of the disclosed electrode arrays can also help to maximize the distance between an electrode's recording site and any scar tissue formed during implantation of the electrode.

In some embodiments, electrode arrays may include one or more openings in the support layer. In the illustrated embodiments, openings in the support layer are depicted in spaced hatching. The openings in the support layer may expose electrodes (also referred to as active sites) configured to stimulate and/or record. Additionally, in the illustrated embodiments, electrode contacts are depicted in crosshatching. Electrodes may include metals such as gold, platinum, iridium, etc. The electrodes may be insulated by materials such as polyimide, epoxy, polyparaxylylene, parylene, acrylics, alumina, silicon nitride, etc. For example, the main substrate and dielectric used in the probes can be polyimide, which can encapsulate the electrical traces. In the illustrated embodiments, the substrates for the electrode arrays are depicted in clear segments. In the illustrated embodiments, electrical traces are depicted in dotted lines.

The electrical traces may include metals and/or metal alloys, including nickel, gold, platinum, platinum alloys, etc. For example, the electrical traces may comprise a thin gold film. In an embodiment, the electrode array can be covered in a parylene sheet, which can have holes for the multiple electrodes. In particular, parylene-c may be deposited onto the threads, forming a film on which the threads may be attached until removal by a robot during robotic surgical implantation.

In some embodiments, a reference electrode configured to read a reference signal from a fluid in a biological tissue may be included on each electrode thread. Thus, in an embodiment, an individual reference electrode may be on each thread and in close proximity to the electrodes for measurement and/or stimulation of the target tissue. This configuration, referred to as an on-probe reference, may provide the technical advantage of providing a more accurate reference electrode reading that reduces spurious effects due to long-distance drifts or random local variations in the potential in the biological fluid. Accordingly, the disclosed system and methods can reduce noise and improve accuracy. In another embodiment, the reference electrode may be on a separate thread, and is not limited by the present disclosure.

II. Linear Array Configuration

FIG. 1A illustrates a schematic top view of an electrode thread 100 in a linear edge configuration, according to an embodiment. In some embodiments, the linear edge configuration of electrode thread 100 may combine favorable technical features of some of the other electrode configurations described below. In this example, a plurality of electrode wire traces 102 can be formed from a conductor, such as thin gold film or another metal, and deposited on a base 104 of a compliant, biocompatible, bio-implantable dielectric material, such as polyimide. In a typical example, there may be thirty-two traces on a single thread 100. The wire traces 102 may be substantially parallel to each other and to the length of dielectric base 104.

In this example, each trace terminates in an electrode contact. For example, trace 106 terminates in contact 108. The contacts can be situated on an edge 172 along the length of the dielectric, hence the configuration of thread 100 is referred to as a "linear edge" configuration. In an embodiment, this configuration can provide a technical advantage by bringing the contacts into close proximity with the target (e.g., a neuron) to be recorded and/or stimulated, for example by equalizing the heights of the contacts and targets, and by having the exposed contacts extend beyond the dielectric edge. Accordingly, the recording and/or stimulation signal can be stronger and clearer by virtue of the linear edge configuration's geometry. In an embodiment, the configuration can also maximize the distance between the recording sites and any scar tissue caused by implantation of the electrode. The contacts may be substantially oval-shaped, and may have dimensions of approximately 14×24 $\mu m^2$, as measured along the minor and major axes of the oval, respectively, and a total area of less than 350 $\mu m^2$. The electrode contacts may also be referred to simply as electrodes.

Thread 100 can be very long and thin, with a width from 5 µm to 50 µm and a nominal thickness from 4 µm to 6 µm, and a length of approximately 20 mm, in a typical example. The thread's thin dimensions and flexibility provide greater biocompatibility, and can minimize tissue displacement in the target. To manage these long, thin threads prior to insertion, parylene-c may be deposited onto the threads to form a film on which the threads remain attached until the surgical robot pulls them off.

In some examples, it may be necessary to maintain sufficient device and/or electrode thickness in order to ensure device integrity and strength, particularly in the linear edge configuration having electrodes along the device edge. In particular, thread thickness in the range of 4 µm to 6 µm may provide sufficient structural integrity.

In some embodiments, electrode thread 100 may include an on-probe reference configuration. For example, one of traces 102 may be a reference electrode configured to read a reference signal from a fluid in the target biological tissue. This may provide a more accurate reference electrode reading that reduces spurious effects due to random local variations.

Figure 1B:
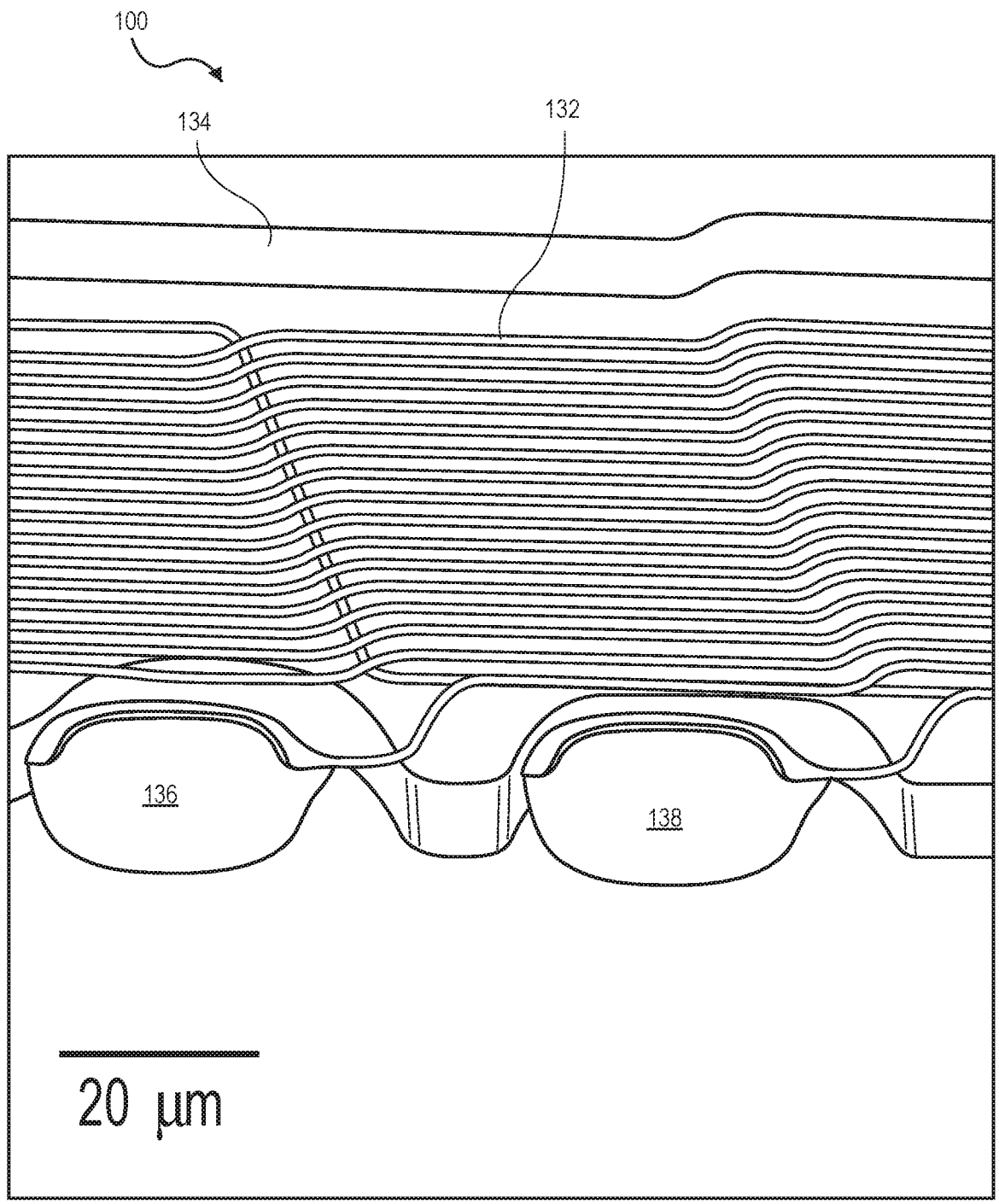
FIG. 1B illustrates a detail view of an electrode thread of FIG. 1A.

FIG. 1B illustrates a detail view of electrode thread 100 of FIG. 1A. In this example, the traces 132 are substantially parallel to the dielectric base 134, and may have creases following contours and/or modulations of width of the base 134. As in the example of FIG. 1A, contacts 136 and 138 are situated on an edge along the length of the dielectric base. The electrode contacts may be substantially oval-shaped, and may have dimensions of approximately 14×24 μm², as measured along the minor and major axes of the oval, respectively, and a total area of less than 350 μm². In an embodiment, the electrode contacts are spaced along the length of the dielectric by between 45 μm and 55 μm center-on-center spacing, e.g. 50 μm spacing. The contacts' small area and compact spacing can provide greater biocompatibility, and can minimize tissue displacement in the target. The electrode contacts may also be referred to simply as electrodes.

Since the individual gold electrode sites can have such small geometric surface areas, surface modifications may be used. Such treatments may provide technical advantages lower the impedance for electrophysiology and increase the effective charge-carrying capacity of the interface. Two such treatments include the electrically conductive polymer poly-ethylenedioxythiophene doped with polystyrene sulfonate (PEDOT:PSS) and iridium oxide (IrOx). In an example, such treatments may achieve impedances of 36.97±4.68 kΩ (n=257 electrodes) and 56.46±7.10 kΩ (n=588) for PEDOT:PSS and IrOx, respectively.

These techniques and processes may include other types of conductive electrode materials and coatings, and are not limited by the present disclosure.

Figure 1C:
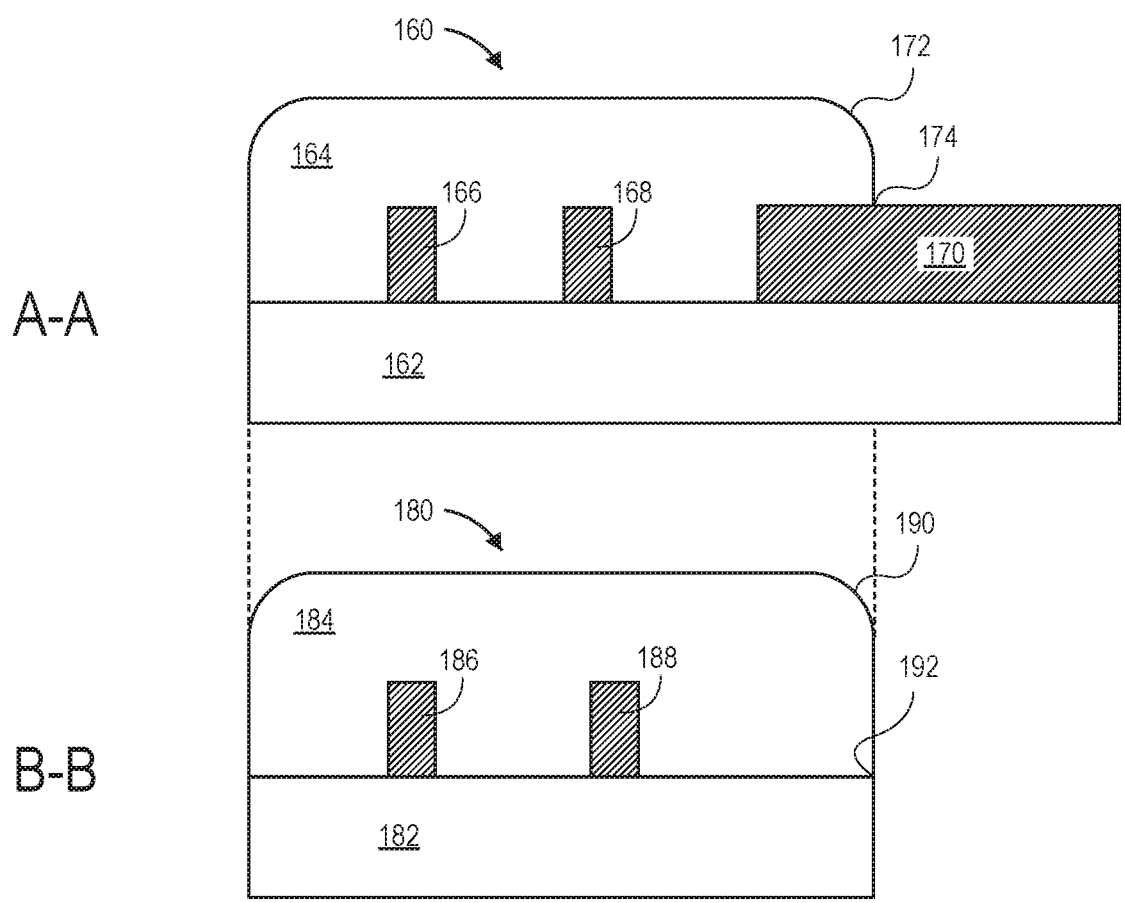
FIG. 1C illustrates two cross-section views of an electrode thread of FIG. 1A.

FIG. 1C illustrates two cross-section views of an electrode thread of FIG. 1A. In this example, cross-section view 160 is a cross-section A-A corresponding to section lines A-A shown in FIG. 1A. In this example, cross-section view 160 shows dielectric base 162 (corresponding to dielectric base 104 in the example of FIG. 1A), partial dielectric cover 164 (also referred to as a top of the dielectric), electrical traces 166 and 168 (corresponding to traces 102 in the example of FIG. 1A), and electrode contact 170 (corresponding to electrode contact 108 in the example of FIG. 1A). In a typical embodiment, dielectric base 162 and partial dielectric cover 164 may comprise a biocompatible, compliant dielectric material, such as polyimide. Alternatively, the dielectric base 162 and/or partial dielectric cover 164 may comprise other materials, such as epoxy, polyparaxylylene, parylene, acrylics, alumina, and/or silicon nitride, and are not limited by the present disclosure. Traces 166 and 168 may be insulated from each other by the dielectric material, for example by cover 164 and/or other portions of the dielectric material.

As shown, electrode contact 170 may have a rectangular cross-section, but may have a rounded shape, such as an oval shape, from a top view, as in the example of FIG. 1B. Accordingly, electrode contact 170 may be an approximately oval or elliptical cylinder. In a typical embodiment, the top and inside of the electrode may be exposed, as in the example of cross-section A-A in FIG. 1C.

In this example, the electrode thread has an edge 172, which can contain electrode contact 170 in the linear edge configuration, as described above. Accordingly, the biocompatible, compliant dielectric of the electrode thread can be referred to as a single dielectric. Thus, the electrode thread and/or the dielectric has a top 164, a bottom 162, and a side 174, and has a top edge defined as the edge 172 where the top 164 meets the side 174. In the linear edge configuration, a portion of electrode contact 170 uncovered by the dielectric can protrude beyond edge 172. The uncovered portion may still rest on dielectric base 162, but may not be covered by top 164.

Likewise, cross-section view 180 is a cross-section B-B corresponding to section lines B-B shown in FIG. 1A. In this example, cross-section view 180 shows dielectric base 182 (corresponding to dielectric base 104 in the example of FIG. 1A; and also referred to as a bottom of the dielectric), partial dielectric cover 184 (also referred to as a top of the dielectric), and electrical traces 186 and 188 (corresponding to traces 102 in the example of FIG. 1A). Again, dielectric base 182 and partial dielectric cover 184 may comprise a biocompatible, compliant dielectric material, such as polyimide, or another material. In this example, the electrode thread has an edge 190, which can contain electrode contacts in the linear edge configuration, as described above. Again, the electrode thread and/or the dielectric has a top 184, a bottom 182, and a side 192, and has a top edge defined as the edge 190 where the top 184 meets the side 192. However, in this example, the B-B cross-sectional portions of traces 186 and 188 in cross-section 180 may be fully covered by top 184 of the dielectric. Traces 186 and 188 can also be insulated from each other by the dielectric material, for example by top 184 and/or other portions of the dielectric material. Other cross sectional portions of the traces may be uncovered, or only partially covered, as described below.

Figure 2A:
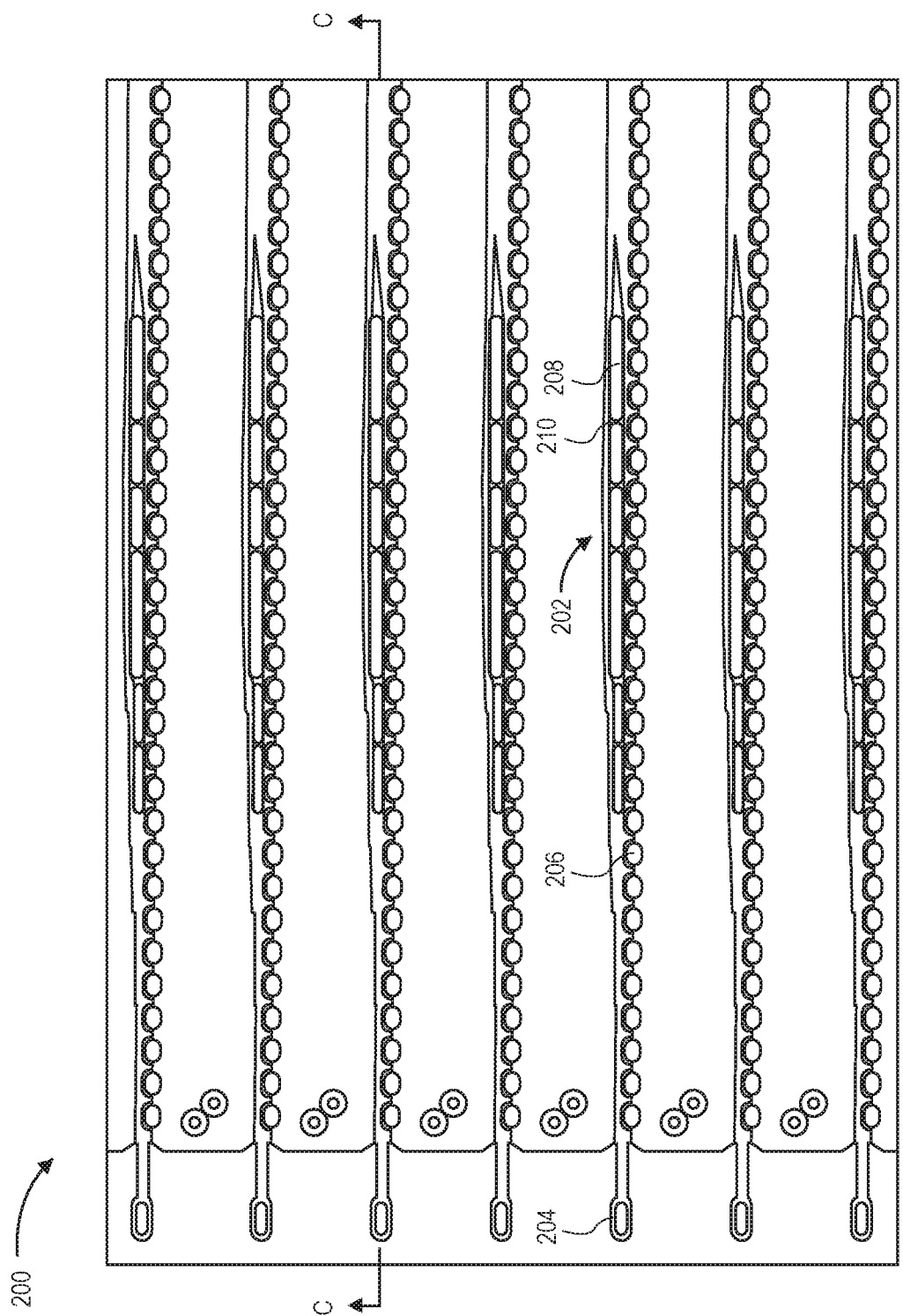
FIG. 2A illustrates a top view of multiple electrode threads in the linear edge configuration, according to an embodiment.

FIG. 2A illustrates a top view of multiple electrode threads 200 in the linear edge configuration, according to an embodiment. In a typical embodiment, a single electrode array 200 may have 48 or 96 threads, and each thread 202 may contain 32 independent traces terminating in electrode contacts. During robotic implantation of the electrode threads, a pillbox-cartridge assembly holding a plurality of electrode threads, such as array 200, may be positioned together with an insertion needle in the surgical field. In an embodiment, the individual threads, such as thread 202, may be arranged on such a pillbox-cartridge assembly.

Each thread 202 may end in an engagement feature, which can facilitate robotic engagement by an insertion needle prior to surgical implantation in the target tissue. In this example, the threads may end in a (16×50) μm² loop, such as loop 204, to accommodate needle threading, where the loop dimensions may be measured along the major and minor axes of the loop. During robotic implantation, such engagement features may be arranged on the cartridge portion of the pillbox-cartridge assembly for engagement by a robotic assembly. A robotic assembly may engage such an engagement feature, e.g. by threading an insertion needle through loop 204 on the electrode, in order to remove the electrode from the cartridge in preparation for surgical implantation in the target tissue. In an embodiment, the engagement feature, such as loop 204, may comprise the same biocompatible, compliant material, such as polyimide, as dielectric bases 104, 162, and 182 of the examples of FIGS. 1A and 1B. Alternatively, the engagement feature, such as loop 204, and/or the dielectric base may comprise other materials, such as epoxy, polyparaxylylene, parylene, acrylics, alumina, and/or silicon nitride, and are not limited by the present disclosure.

In this example, each thread 202 may be partially covered in a second layer 206 of the biocompatible, compliant dielectric. Second layer 206 may correspond to partial dielectric cover 164 and partial dielectric cover 184 in the example of FIG. 1C. Thus, in an embodiment, the second layer 206 may comprise the same biocompatible, compliant dielectric material, such as polyimide, as bases 104, 162, and 182 of the examples of FIGS. 1A and 1B. Alternatively, the second layer 206 and/or the base may comprise other materials, such as epoxy, polyparaxylylene, parylene, acrylics, alumina, and/or silicon nitride, and are not limited by the present disclosure. Each thread 202 may also have exposed portions 208 of metal, for example where an electrical trace, a plurality of electrical traces, such as traces 132 in the example of FIG. 1B, or a thin metal foil is not covered by the second layer 206 of the dielectric. However, these exposed portions 208 may also be partially covered by strips, such as strip 210, of the biocompatible, compliant dielectric material.

Figure 2B:
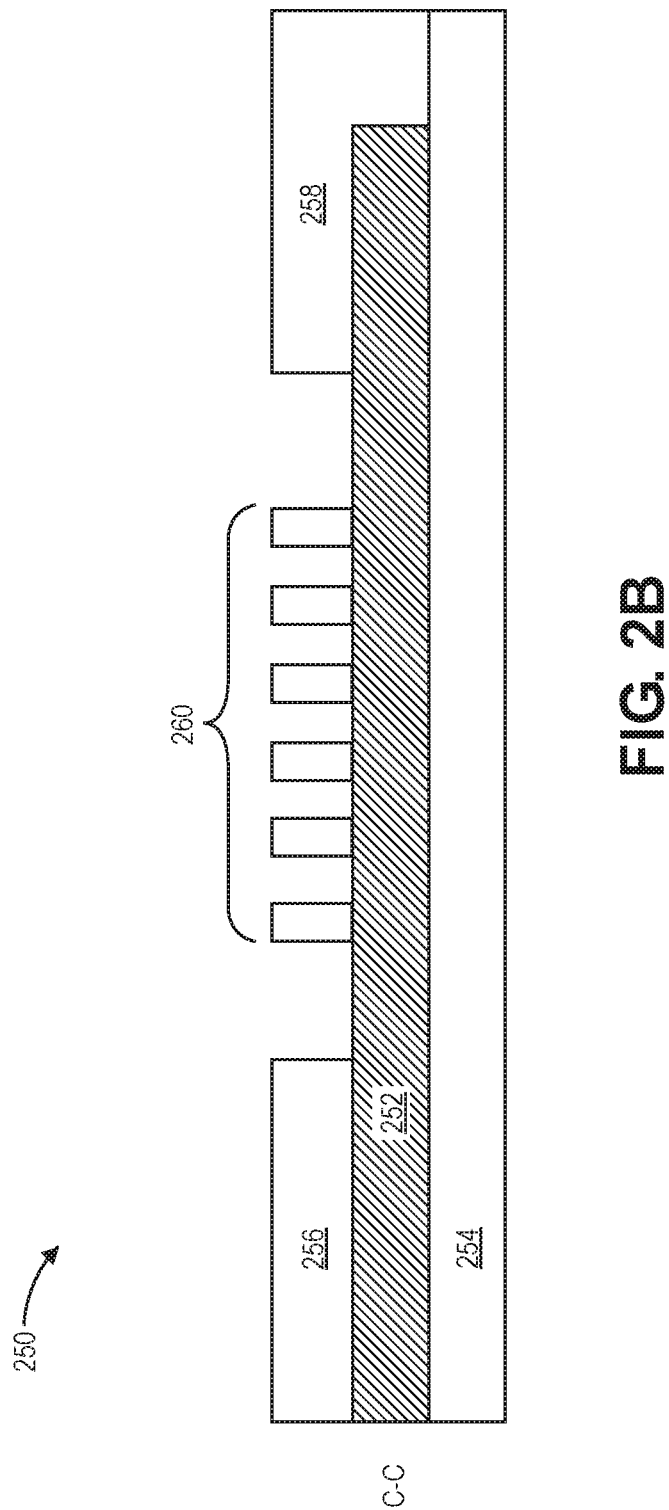
FIG. 2B illustrates a lengthwise cross-section view of one of the electrode threads of FIG. 2A.

FIG. 2B illustrates a lengthwise cross-section view 250 of one of the electrode threads of FIG. 2A. In this example, cross-section view 250 is a cross-section C-C corresponding to section lines C-C shown in FIG. 2A. As shown, section C-C includes electrical trace 252. In this example, a biocompatible, compliant dielectric material forms a base 254, a partial cover 256, a partial cover 258 including a side, and partially covering strips 260 (corresponding to strip 210 in the example of FIG. 2A). The biocompatible, compliant dielectric material can comprise polyimide or another material. Accordingly, together, partial cover 256, partial cover 258 including a side, and partially covering strips 260 can comprise the top or cover of the biocompatible, compliant dielectric material, which partially covers electrical trace 252. Strips 260 and/or the rest of the dielectric top may cover some portions of traces 252, but not others.

In this example, partial cover 258 including the right side may cover and/or insulate the right end of traces 252, whereas the left end of traces 252 may lead to an engagement feature, such as loop 204 in the example of FIG. 2A. However, note that in some embodiments, loop 204 may also comprise the biocompatible, compliant dielectric material, such as polyimide. Thus, both ends of traces 252 may be insulated.

Figure 3:
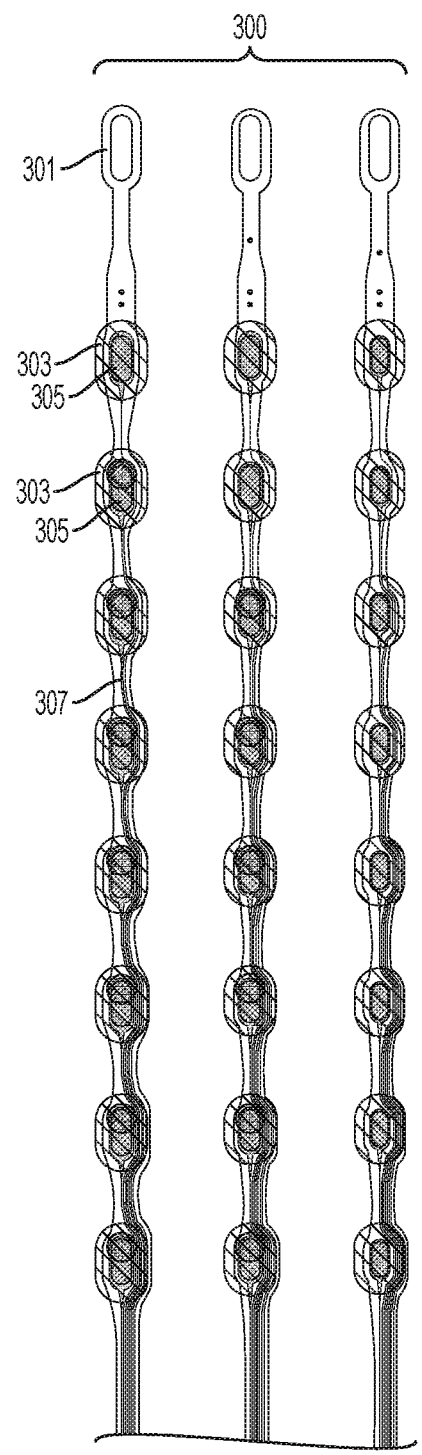
FIG. 3 illustrates three linear electrode arrays, according to an embodiment.

FIG. 3 illustrates three linear arrays 300 each having an engagement feature 301, and a plurality of openings 303 in a support layer, such as parylene, according to an embodiment. An opening 303 in the support layer may include an electrode 305. Electrical traces 307 may connect the openings 303 and electrodes 305 to an integrated circuit (not shown). In the depicted embodiment, the electrode array is substantially linear in shape and may have a number of openings in the support layer and/or a number of active sites (e.g., 8, 12 or more). The electrode 305 may be configured to record and/or stimulate. The electrodes 305 may be arranged towards the edge of the probe such that the exposed metal is flush with the target tissue for implantation.

Figure 4:
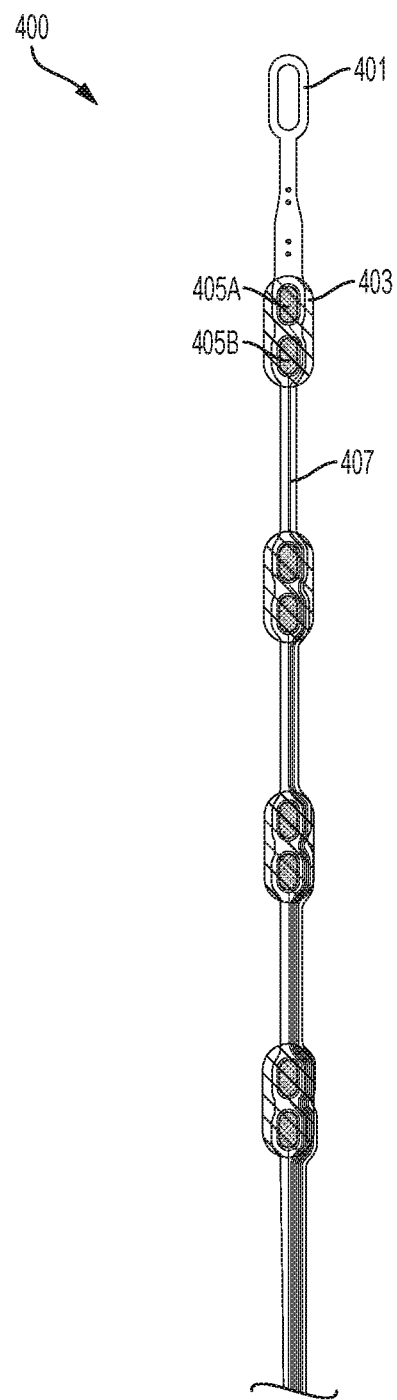
FIG. 4 illustrates a linear array according to a stereotrode configuration, in accordance with an embodiment.

FIG. 4 illustrates a linear array 400 according to a "stereotrode" configuration, according to an embodiment. Linear array 400 includes an engagement feature 401 for detachably coupling the array to an insertion needle, and a plurality of openings 403 in a support layer, such as parylene, each opening having a group of two electrodes 405A, 405B. Such groups of multiple electrodes can facilitate sorting. In an embodiment, the groups can have more than two electrodes, and are not limited by the present disclosure. For example, a linear array having groups of four electrodes can be referred to as a "tetrode" configuration. Electrical traces 407 may connect the openings 403 and electrodes 405A, 405B to an integrated circuit (not shown). As the two electrodes, 405A and 405B, located within an opening 403 may record the same electrical activity (albeit with an offset due to their relative positioning), in some embodiments the electrical recordings obtained from the electrodes may be used for localization of the recorded electrical activity. The electrodes 405A, 405B may be arranged towards the edge of the probe such that the exposed metal is flush with the target tissue for implantation.

III. Tree Array Configuration

Conventional implantable devices may be prone to chronic inflammation and/or acute immune response at the insertion site, which can interfere with the electrodes' ability to stimulate or record at the insertion site. In some embodiments, the disclosed system and methods can avoid or greatly reduce such problems by presenting a very small cross-sectional area for insertion into biological tissue, while also providing multiple electrodes configured to extend beyond the site of insertion trauma to the tissue. In particular, in some embodiments, the disclosed electrode arrays can be configured with a substantially tree-like structure, which can avoid or greatly reduce such interference from an insertion scar, or other immune system response.

A "tree" structure includes a structure with a central longitudinal element with elongated branch elements, each connected at one end to the central longitudinal elements, or as otherwise known in the art.

Figure 5:
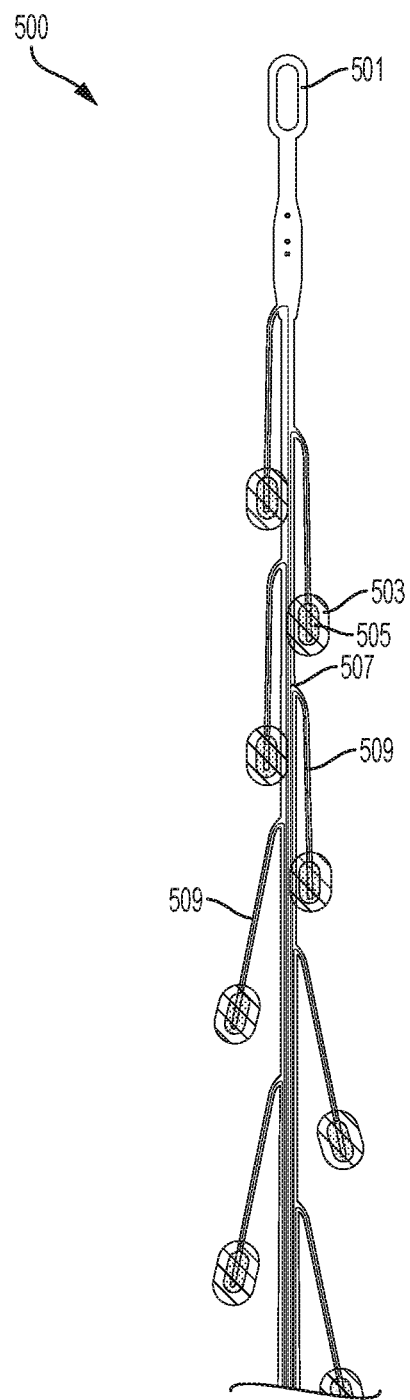
FIG. 5 illustrates an electrode array according to a tree configuration, according to an embodiment.

FIG. 5 illustrates an electrode array 500 according to a "tree" configuration, according to an embodiment. In this example, electrode array 500 includes an engagement feature 501 for detachably coupling the array to an insertion needle, and a plurality of openings 503 in the support layer (e.g., parylene), each opening exposing one or more electrodes 505. Electrical traces 507 may connect the electrodes 505 to an integrated circuit (not shown). In embodiments according to the tree configuration, the openings 503 and/or electrodes 505 can be situated on branching structures 509, separated from the main structure (or "trunk").

In particular, branching structures 509 can be configured to extend from the main structure, such that they form acute angles with the main structure and/or are perpendicular to the main structure. Accordingly, the openings 503 and/or electrodes 505 may be located outside of an area of chronic tissue inflammation and/or an insertion wound. In an embodiment, different branches can have differing branching angles from the main trunk. Alternatively, branching structures 509 can pivot about their points of connection such that branching structures 509 can expand away from the insertion area over time.

In an embodiment, branching structures 509 can wrap around the insertion needle during insertion. In an embodiment, the branches and/or trunk (which can also be referred to as a "shank") can be made from compliant materials, such as polyimide.

In an embodiment, the trunk can have a thickness of approximately 25-30 μm, while the branches can have an approximate thickness of 5.5 μm. The electrodes can have a width of approximately 10 μm, and the openings in the support layer can each have an area of approximately 300 μm².

IV. Quadrapus Array Configuration

In another embodiment, the disclosed electrode arrays can solve the problem of immune-response interference with the electrodes' function by providing multiple thin, flexible electrodes that can extend beyond the site of insertion over a period of time. In particular, the electrode arrays can be configured with structures referred to herein as a "quadrapus" and/or an "octopus." Moreover, when implanted, the active sites in this embodiment may surround an object (e.g., a neurological structure) of interest, providing for three-dimensional recording and/or stimulation of the object of interest.

Figure 6:
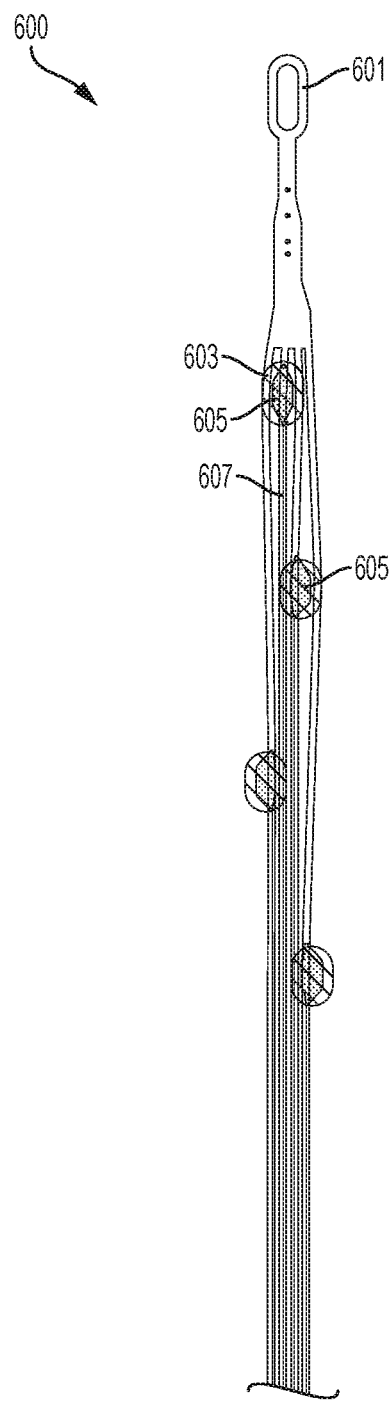
FIG. 6 illustrates an electrode array according to a quadrapus configuration, according to an embodiment.

FIG. 6 illustrates an electrode array 600 according to a "quadrapus" configuration, according to an embodiment. In this example, electrode array 600 includes an engagement feature 601 for detachably coupling the array to an insertion needle, and a plurality of openings 603 in a support layer (e.g., parylene), each active site having one or more electrodes 605. Electrical traces 607 may connect the openings 603 and electrodes 605 to an integrated circuit (not shown). As illustrated in FIG. 6, there are four openings 603, each located on a separate thread or strand 613 (which may also be referred to as a "tentacle"), and the four threads or strands can be joined at engagement feature 601, e.g. a loop.

In an embodiment, the openings 603 may be spaced at different heights along the thread or strand 613. In some embodiments, electrode array 600 is not limited to four threads or strands 613 and may have a plurality containing any number of threads. For example, an electrode array having eight threads can be referred to as an "octopus" structure.

In an embodiment, threads or strands 613 can wrap around the insertion needle during insertion, and can splay upon removal of the insertion needle. A further advantage of the plurality of threads or strands 613 is their ability to dissipate mechanical strain, for example strain exerted on an individual strand has little influence on other strands.

V. Minimal-Size Electrode Array Configuration

Figure 7:
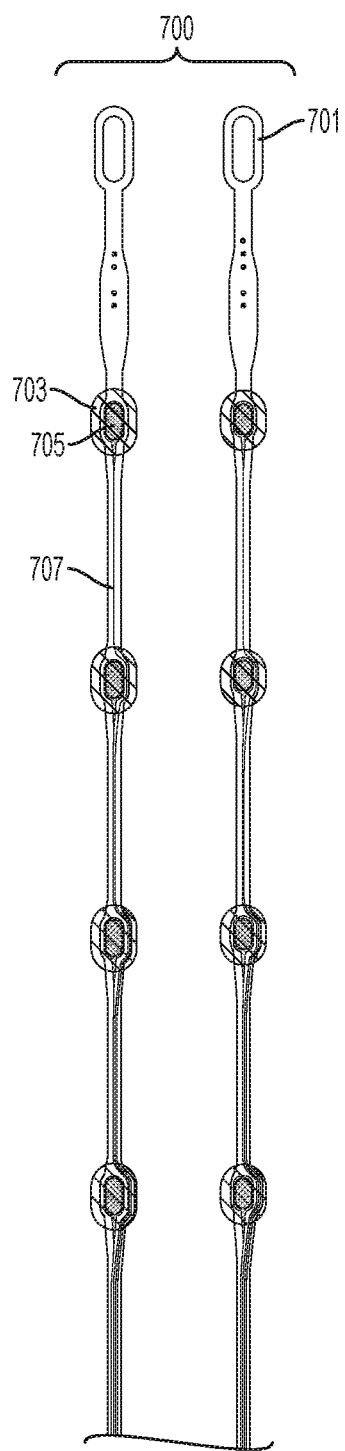
FIG. 7 two linear arrays according to a minimal-size configuration, according to an embodiment.

In an embodiment, the electrode arrays can be designed to have a minimal size, so as to minimize the immune response of the target biological tissue upon implantation. FIG. 7 illustrates two linear arrays 700 according to a minimal-size configuration, according to an embodiment. Each having an engagement feature 701, and a plurality of openings 703 in a support layer (e.g., parylene), configured to have one or more electrodes 705. Electrical traces 707 may connect openings 703 and/or electrodes 705 to an integrated circuit (not shown). For that reason, the electrode arrays 700 may be configured to be sized below 10 micrometer diameter, for example electrodes 705 may be sized between approximately 2 to 10 μm. In an embodiment, in order to reduce the size of linear arrays 700 further, linear arrays 700 may be configured with fewer openings 703 and/or electrodes 705 so that biological tissue immune response is minimized.

Figure 8:
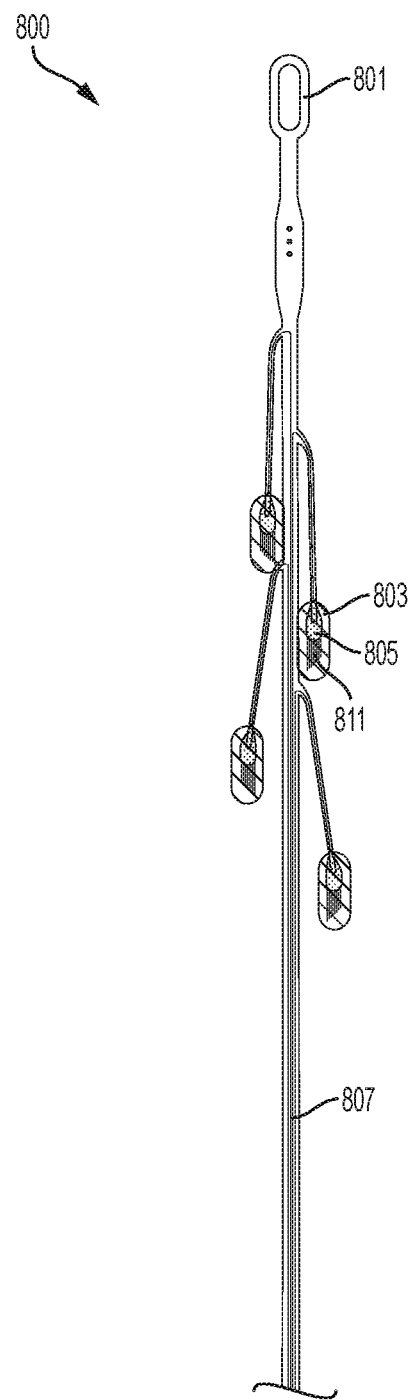
FIG. 8 illustrates an electrode array, according to an embodiment.

FIG. 8 illustrates an electrode array 800 having an engagement feature 801, and a plurality of openings 803 in a support layer (e.g., parylene), configured to have one or more electrodes 805. The electrodes 805 may have one or more projections 811. In some embodiments, the projections 811 may be metallic. For example, in some embodiments, projections 811 may be made of platinum, iridium, gold, or similar materials. In some embodiments, the projections 811 may be sized in the range of approximately 500-1000 nm. For example, projections 811 may be approximately 750 nm in size. The projections 811 (which can also be referred to as "fingers") may be configured to extend into the biological tissue, in order to be used for recording and/or stimulation. In some embodiments, the projections 811 may be nonplanar to the electrode array 800 such that the projections 811 may be used for three-dimensional recording and/or stimulation.

VI. Scaffold Array Configuration

Figure 9:
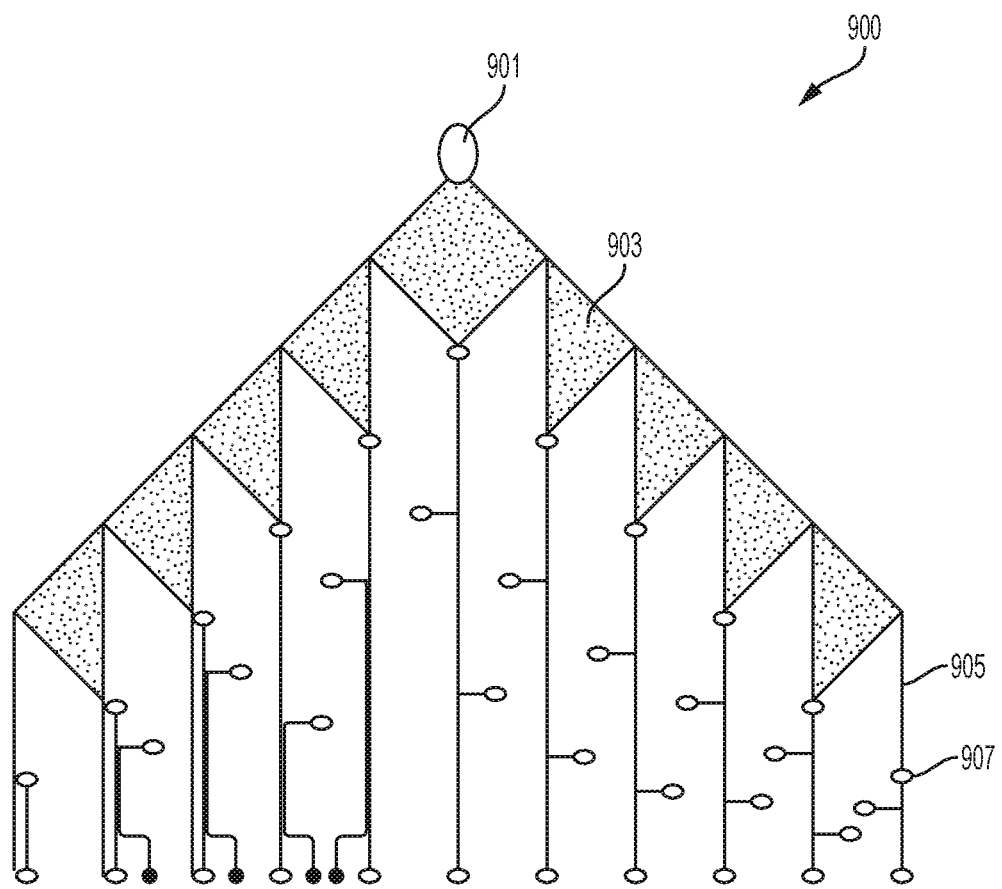
FIG. 9 illustrates an electrode array according to a scaffold configuration, in accordance with an embodiment.

FIG. 9 illustrates an electrode array 900 having an engagement feature 901, a scaffolding 903, and one or more electrical traces 905 connected to the scaffolding 903. Each of the electrical traces 905 may include one or more electrodes 907 configured to record and/or stimulate biological tissue. In some embodiments the scaffolding 903 may include polyimide or similar materials. The electrode array depicted in FIG. 9 combines aspects of the tree-like electrode structure illustrated in FIG. 5 with the structure of FIG. 6. In some embodiments, each strand of the electrode array may be sized to be under approximately 6 μm in diameter. Additionally, in some embodiments, the polyimide scaffolding may connect to approximately three electrical traces, each trace having a length between approximately 500 nm to 1000 nm. For example, in some embodiments, the metal trace may be approximately 750 nm or less. In some embodiments the electrode array 900 illustrated in FIG. 9 may include thirty or more electrodes such as electrodes 907 providing thirty or more recording and/or stimulating sites. Despite having thirty or more recording and/or stimulating sites, the entire electrode array may be implanted in biological tissue with a single needle insertion. Notably, an implantation system may implant flexible electrodes with complex, porous geometries such as those illustrated in FIG. 9. During implantation (or insertion), the flexible electrode's extended structure may be compacted to fit within a small insertion hole. Once implanted, the electrode will unfold over time as cells grow into the insertion area and repair the wound.

VII. Variations

In various embodiments, one or more of the electrode arrays illustrated in FIGS. 1-9 may be varied, combined, or distributed in any suitable combination so as to create an electrode array. For example, in some embodiments, the tree-like structures illustrated in FIG. 5 may branch off of a number of threads or strands, such as those in the quadrapus configuration of FIG. 6. Such a configuration may reduce the size presented by the electrode array during insertion, while also providing flexibility and separating the active sites from the insertion site.

In another example, multiple electrodes located on the same opening in the support layer, such as those of the stereotrode structure depicted in FIG. 4, may be placed along various threads or strands, as in the quadrapus structure of FIG. 6. In an embodiment, the openings and/or active sites can be situated at the same depth, but in different orientations. In an embodiment, the multiple electrodes can be at different heights on the same opening. Such hybrid configurations can minimize the collective impedance of the active sites, as well as improving the system's ability to localize electrical signals in three dimensions.

In some embodiments, the disclosed electrode arrays depicted in FIGS. 1-9 may be configured to terminate in an engagement feature such as engagement features 201, 301, 401, 501, 601, 701, 801, and 901. In some embodiments, the engagement feature may include a loop (a hole in the substrate), a hook, a cup, a protrusion, an extended arm, a "v," etc. In some embodiments, the engagement feature may be configured to detachably couple the electrode array with one or more reciprocal engagement features on an insertion needle. In some embodiments, the disclosed electrode arrays may terminate without an engagement feature.

In another example, a branched hierarchy of active sites can be configured with one loop as an engagement feature.

In some embodiments, the disclosed electrodes in FIGS. 1-9 may be configured to transmit neurological impulses as voltage or current signals and pass the signals to a specially configured integrated circuit. such as that described in U.S. patent application Ser. No. 16/354,059, "Network-on-Chip for Neurological Data," filed on Mar. 14, 2019, and hereby incorporated by reference.

In some embodiments, an electrode array including one or more of the electrode arrays illustrated in FIGS. 1-9 may be assembled within a cartridge including one or more electrode arrays. In some embodiments, a robotic system may remove the electrode array from the cartridge and implant the electrode array into biological tissue. Example cartridge and robotic systems include those described in U.S. patent application Ser. No. 16/569,590, "Device Implantation Using A Cartridge," filed concurrently herewith, and hereby incorporated by reference.

VIII. Fabrication Processes

The electrode arrays depicted in FIGS. 1-9 may be manufactured by the fabrication processes illustrated in FIGS. 10-19. In some embodiments, the electrode arrays can be fabricated using stepper lithography, which can pattern a large number (e.g., 32, 64, 128, 256) of electrodes onto a single probe. In an embodiment, a wafer-level microfabrication process enables high-throughput manufacturing of the devices. For example, ten thin film arrays may be patterned on a wafer, each array with 48 or 96 threads, e.g. for a total of 3,072 electrode contacts. In an embodiment, the disclosed electrode arrays can be fabricated via a custom process in order to produce neural probes that are minimally displacive of the target tissue and contain a variety of biocompatible thin film materials.

Figure 10:
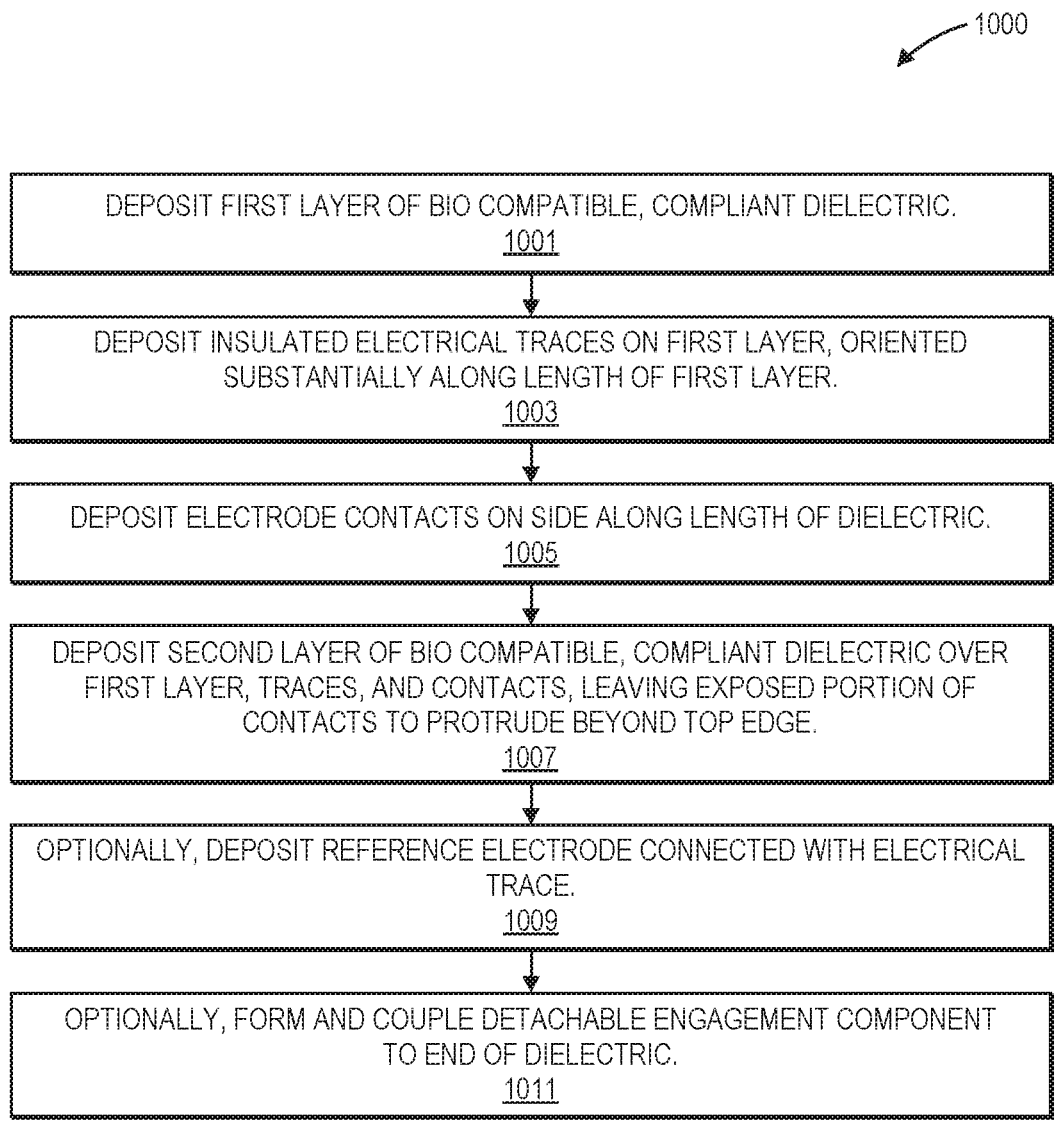
FIG. 10 is a flow chart illustrating an exemplary method for fabricating a bio-implantable compliant electrode, according to an embodiment.

FIG. 10 is a flow chart illustrating an exemplary method 1000 for fabricating a bio-implantable compliant electrode, according to an embodiment. In an embodiment, method 1000 may fabricate a single thread containing multiple electrodes (e.g. 32, 64, or 128 electrode traces terminating in contacts). In a first step 1001, a first layer of biocompatible, compliant dielectric can be deposited along a length of the dielectric. The first layer of dielectric can have a top edge defined by a top and a side. The biocompatible, compliant dielectric may be bio-implantable, i.e., implantable for long periods in biological tissue, such as brain or neurological tissue, without inciting immune reaction. The dielectric may be biocompatible and bio-implantable by virtue of its materials and/or its other properties. For example, the biocompatible dielectric may comprise polyimide, epoxy, polyparaxylylene, parylene, and/or acrylic. In an embodiment, the dielectric has a thickness between 4 µm and 8 µm, and a length between 15 mm and 25 mm. The dielectric can have a width from 5 to 50 µm.

In a second step 1003, insulated electrical traces may be deposited on the first layer of bio-implantable dielectric. The electrical traces may be oriented substantially along the length of the dielectric. A respective electrical trace may be insulated from a second electrical trace. In an embodiment, the insulated electrical traces can comprise at least 20 electrical traces, e.g. 32 electrical traces per thread. The electrical traces may also be biocompatible, and can comprise gold or another metal. In an embodiment, the traces may comprise another conducting material, and are not limited by the present disclosure.

In some embodiments, the dielectric can have a plurality of branches branching from a central stem structure, and in this case the traces can be deposited along the branches. For example, the branches can comprise multiple flexible strands (e.g., at least four strands), as in the linear electrode array in the example of FIG. 6. In this case, the traces can be deposited along the strands. In a second example, the stem structure can include a principal rod, and the branches can each comprise a secondary rod branching from the principal rod, and the traces can be deposited along the secondary rods, as in the tree structure in the example of FIG. 5. In a third example, the stem structure of the dielectric includes a compliant scaffold configured to fold during implantation, as in the example of FIG. 9.

In a third step 1005, electrode contacts may be deposited on a side along the length of the biocompatible dielectric. Each electrode contact may be electrically coupled to a respective electrical trace. The electrode contacts may also be biocompatible, and can comprise gold or another metal. In an embodiment, the contacts may comprise another conducting material, and are not limited by the present disclosure. In an embodiment, the multiple electrode contacts can comprise at least 20 electrode contacts, or between 20 and 50 electrode contacts, e.g. 32 contacts per thread. In an embodiment, a respective electrode contact has a maximum feature size, or characteristic size of the features fabricated on the contacts, of 10 µm, and an area of less than 350 µm$^2$. For example, a respective contact can have dimensions substantially equal to 14×24 µm$^2$. In an embodiment, the respective electrode contact has a substantially oval shape, and the dimensions can refer to major and minor axes of the oval shape. In an embodiment, the electrode contacts are spaced along the length of the dielectric by between 45 µm and 55 µm center-on-center spacing, e.g. 50 µm spacing.

These microscopic feature sizes and overall sizes, as well as the electrodes' flexibility, can enhance the electrodes' biocompatibility. Accordingly, large numbers of electrodes can be implanted, such as 3,072 electrodes per array, thereby providing better recording and stimulation performance.

In embodiments where the dielectric has a plurality of branches branching from a central stem structure, the electrode contacts can be situated on the branches and coupled to respective electrical traces also situated on the same branches.

In a fourth step 1007, a second layer of the biocompatible, compliant dielectric may be deposited over the first layer, electrical traces, and electrode contacts. An exposed portion of a respective electrode contact may be left to protrude beyond a top edge of the dielectric defined by a top and a side along the length of the dielectric.

In an optional fifth step 1009, a reference electrode may be deposited. The reference electrode may be configured to read a reference signal from a fluid in a biological tissue. The reference electrode may be connected with one of the electrical traces. Thus, in an embodiment, the reference electrode may be deposited directly on the same thread as the electrodes for measurement and/or stimulation of the target tissue, and therefore it is not necessary to fabricate a separate thread holding the reference electrode. Thus, the disclosed system and methods can provide an individual reference electrode on each thread. This may provide the technical advantage of providing a more accurate reference electrode reading that reduces spurious effects due to long-distance drifts or random local variations in the potential in the biological fluid. Accordingly, the disclosed system and methods can reduce noise and improve accuracy. In another embodiment, the reference electrode may be on a separate thread, and is not limited by the present disclosure.

In an optional sixth step 1011, an engagement component configured to couple detachably to an insertion needle may be formed and coupled to an end of the dielectric. In an embodiment, the engagement component can comprise a loop with a length between 40 μm and 60 μm. The loop length may be measured along the major axis of the loop.

Figure 11:
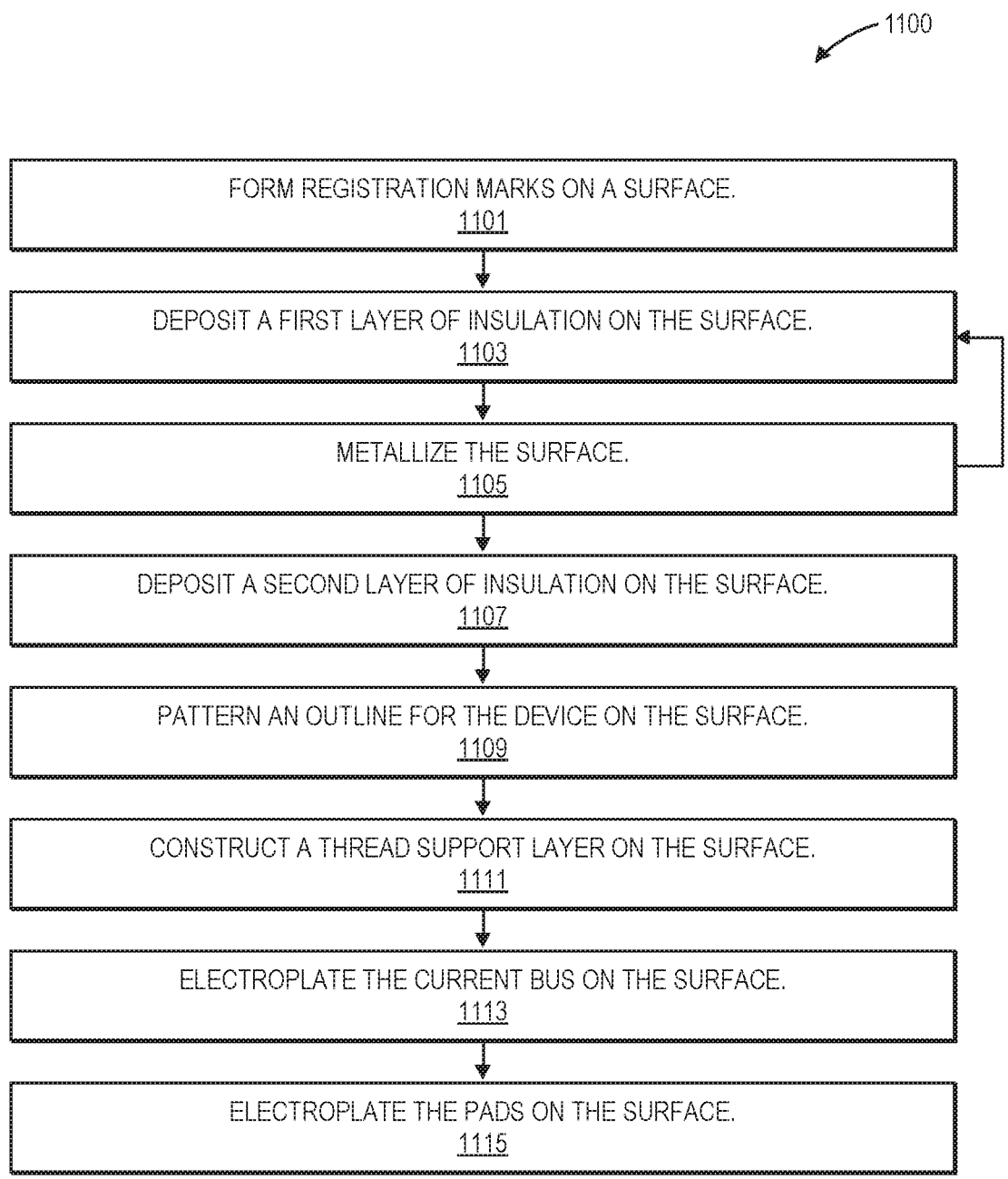
FIG. 11 is a flow chart illustrating an exemplary technique for fabricating electrode arrays, according to an embodiment.

FIG. 11 is a flow chart illustrating an example process 1100 for fabricating electrode arrays in accordance with various aspects of the present disclosure. In the illustrated example, an electrode array is fabricated by forming registration marks on a surface 1101, depositing a first layer of insulation on the surface 1103, metallizing the surface 1105, depositing a second layer of insulation on the surface 1107, patterning an outline for the device on the surface 1109, constructing a thread support layer on the surface 1111, electroplating the current bus of the surface 1113, and electroplating the bond pads on the surface 1115. In an embodiment, steps 1103 and 1105 can be repeated multiple times before continuing to step 1107.

Exemplary techniques used in connection with the processes illustrated in FIG. 11 are discussed in FIGS. 12-19. It is understood, however, that the present disclosure is not limited to these specific techniques, embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

Figure 12:
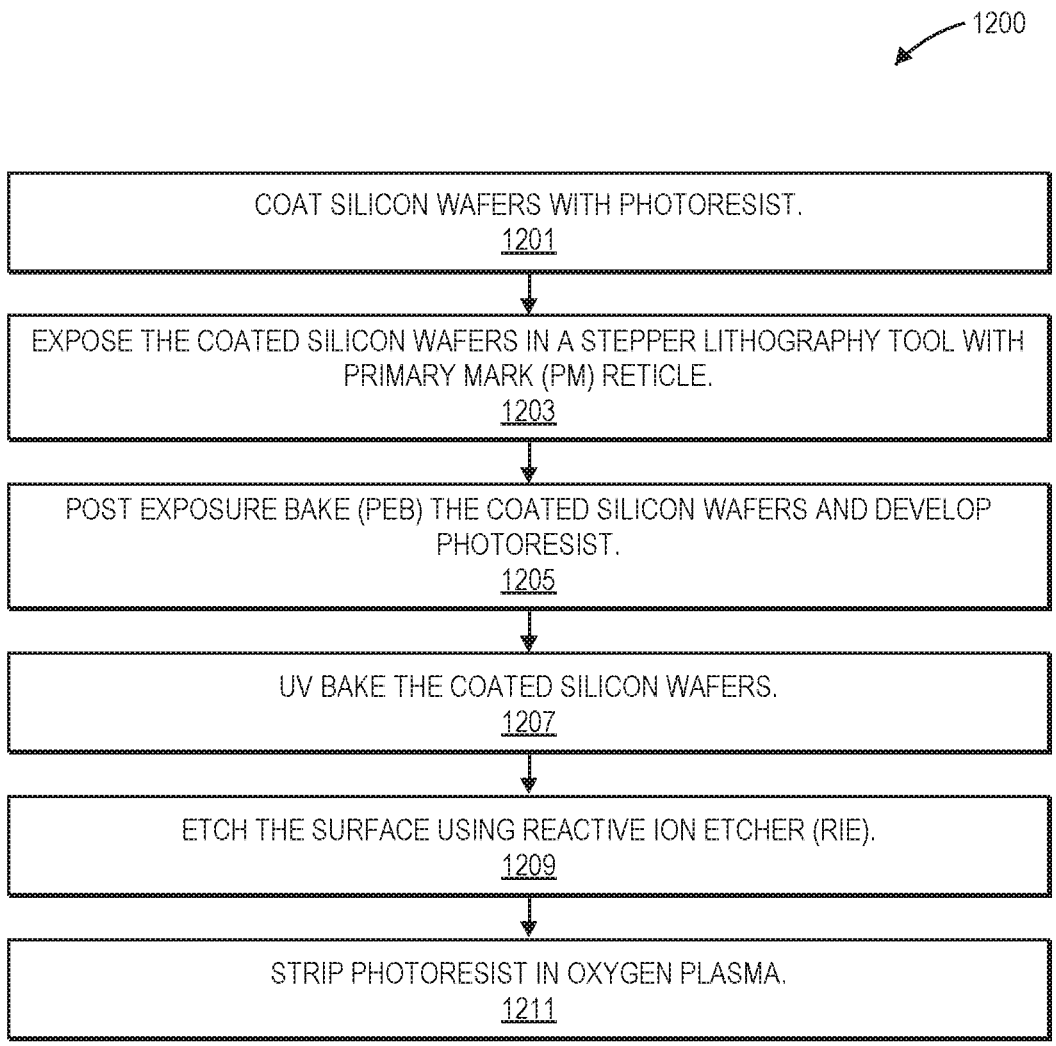
FIG. 12 is a flow chart illustrating an exemplary technique for forming registration marks on a surface while fabricating electrode arrays, according to the present disclosure.

FIG. 12 illustrates an exemplary technique 1200 for forming registration marks on a surface, related to step 1101. By forming registration marks, the described process for fabricating electrode arrays may allow for layer to layer alignment at a resolution of approximately 40 nm. In this manner, the described process for fabricating electrode arrays may allow for higher resolution features. As illustrated in the figure, in an exemplary technique, the step of forming registration marks on a surface 1101 may include coating silicon wafers with photoresist 1201 (e.g., 1200 nm Deep UV (DUV)), exposing the coated silicon wafers in a stepper lithography tool with primary mark (PM) reticle 1203, post-exposure baking (PEB) the coated silicon wafers to develop photoresist 1205, UV baking the coated silicon wafers 1207, etching a suitable depth (e.g., 120 nm) in the surface using Reactive Ion Etcher (RIE) 1209, and stripping the photoresist using oxygen plasma 1211.

Figure 13:
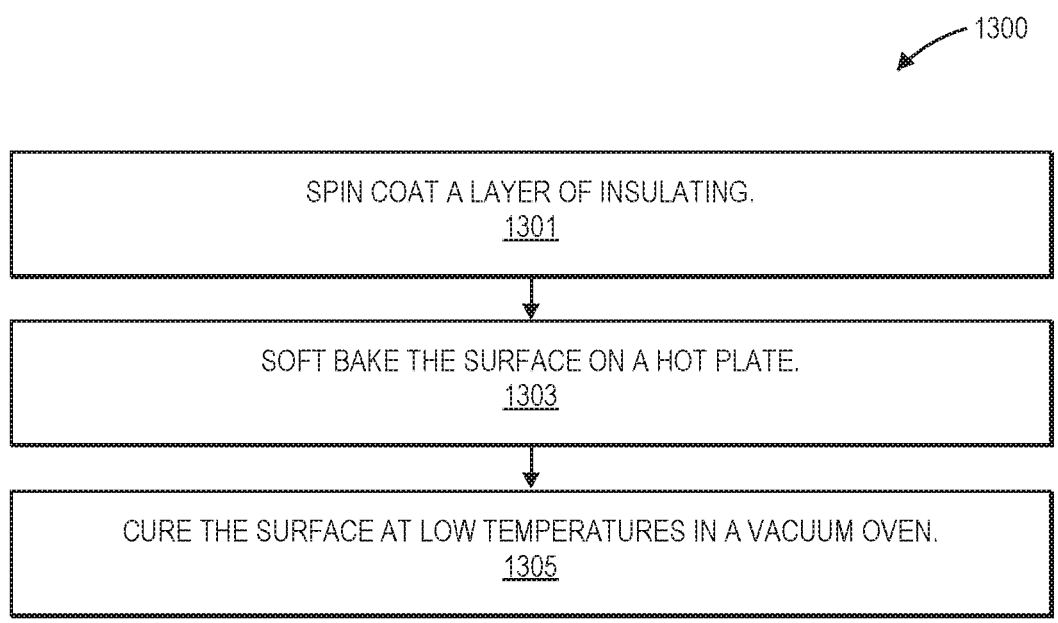
FIG. 13 is a flow chart illustrating an exemplary technique for depositing a first layer of insulation onto a surface while fabricating electrode arrays, according to the present disclosure.

FIG. 13 illustrates an exemplary technique 1300 for depositing a first layer of insulation onto a surface, related to step 1101. As illustrated in the figure, in an exemplary technique, the step of depositing a first layer of insulation on the surface 1103 may include spin coating a layer of insulating materials (e.g., approximately 2 μm of polyimide) onto the surface 1301, soft baking the surface on a hot plate 1303, and curing the surface at low temperatures in a vacuum oven 1305. In some embodiments, soft baking the surface on a hot plate 1303 may improve the polyimide wafer coverage and decrease the chances of solvents being trapped in the film during the curing step 1305. In an embodiment, technique 1300, or some steps therein, can be repeated multiple times as needed.

Figure 14:
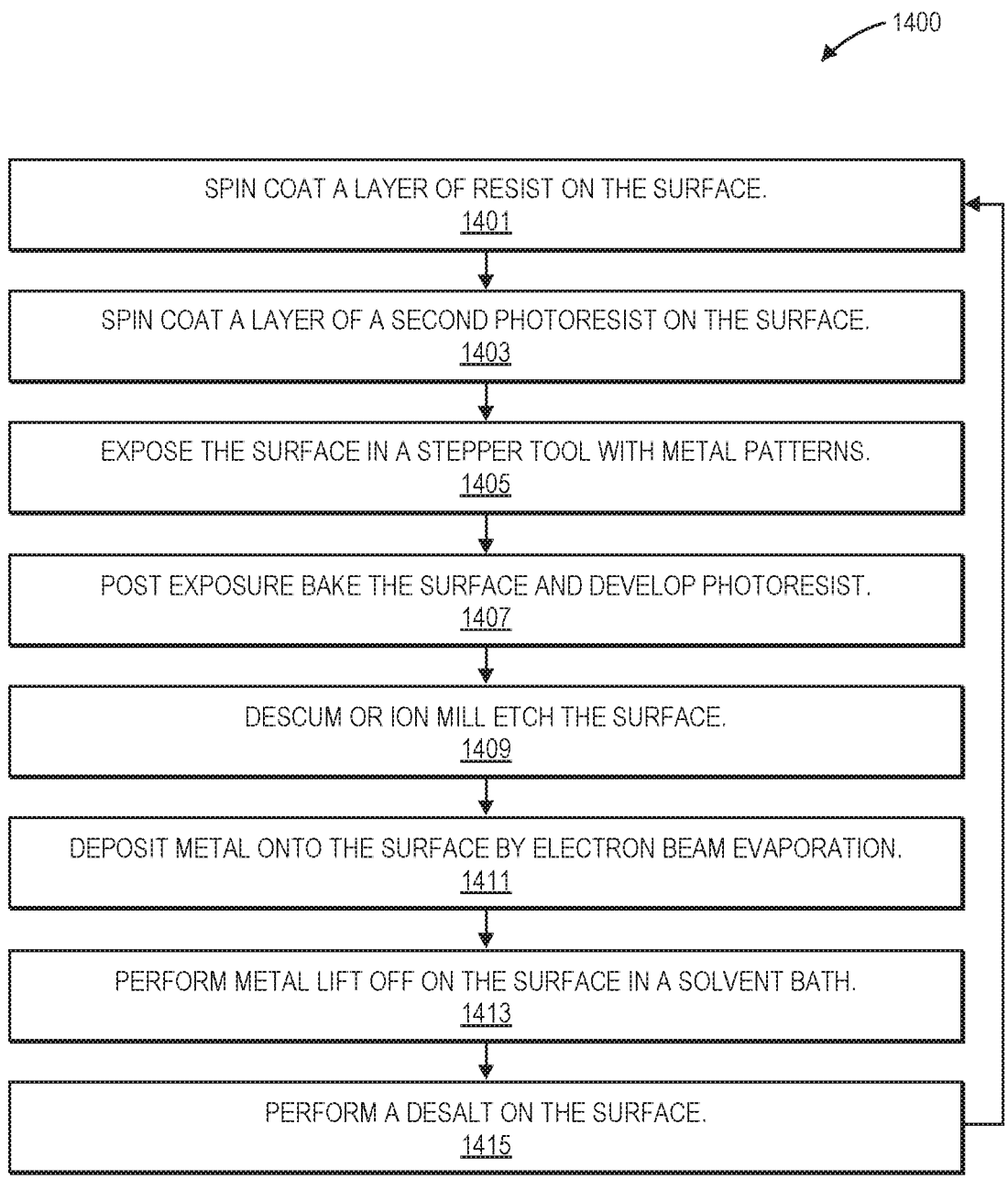
FIG. 14 is a flow chart illustrating an exemplary technique for metallizing a surface while fabricating electrode arrays, according to the present disclosure.

FIG. 14 illustrates an exemplary technique 1400 for metallizing a surface, related to step 1105. As illustrated in the figure, in an exemplary technique, metallizing the surface 1105 may include the steps of spin coating a layer of resist (e.g., approximately 350 nm of resist (e.g., LOR3A)) on the surface 1401, spin coating a layer of photoresist (e.g., approximately 420 nm of deep UV) on the surface 1403, exposing the surface in a stepper tool with metal patterns 1405, post-exposure baking the surface and developing the photoresist 1407, descumming or ion mill etching the surface 1409, placing the surface in an electron beam evaporator chamber 1411, depositing a metal (e.g., platinum) onto the surface by electron beam evaporation 1413, performing metal lift-off on the surface in a solvent bath 1415, and performing a desalt on the surface 1417. In an embodiment, technique 1400, or some steps therein, can be repeated multiple times as needed.

In some embodiments, the processes involved in metallizing the surface 1105 may include one or more steps that are specific to stepper lithography and may provide for higher resolution features. In some embodiments, the step of descumming or ion mill etching the surface 1409 may improve the adhesion of metal traces to the polyimide surface.

Figure 15:
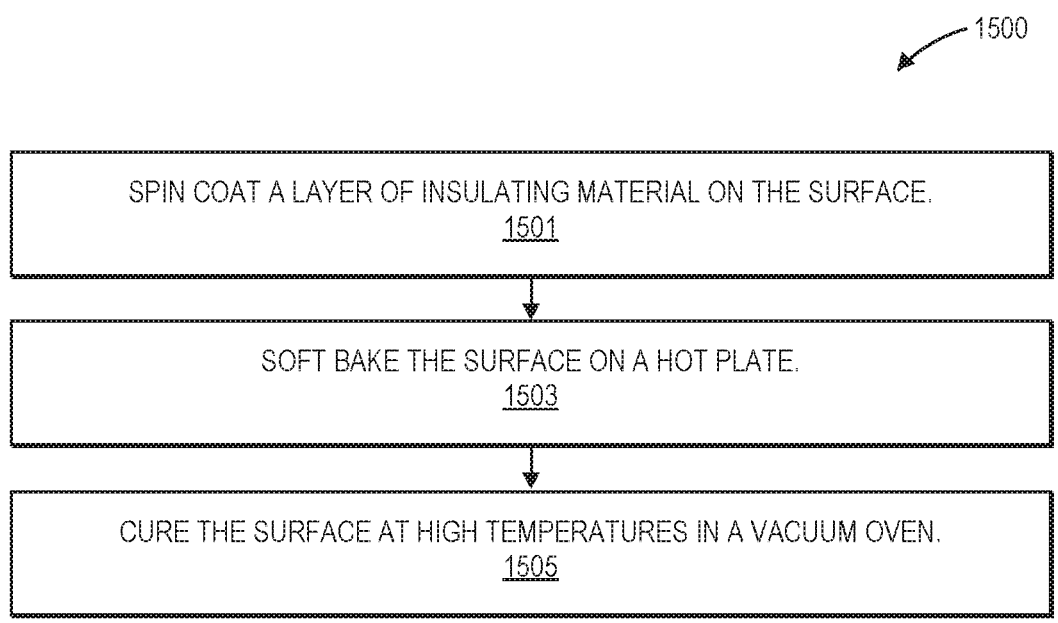
FIG. 15 is a flow chart illustrating an exemplary technique for depositing a second layer of insulation on a surface while fabricating electrode arrays, according to the present disclosure.

FIG. 15 illustrates an exemplary technique 1500 for depositing a second layer of insulation on a surface, related to step 1107. As illustrated in the figure, in an exemplary technique, depositing a second layer of insulation on the surface 1107, may include spin coating an insulating material on the surface (e.g., coat of approximately 2 μm of polyimide on the surface) 1501, soft baking the surface on a hot plate 1503, and curing the surface at high temperatures in a vacuum oven 1505.

Similar to the process described above in relation to FIG. 13, by soft baking the surface on a hot plate 1503, the polyimide wafer coverage may be improved and the likelihood of solvents being trapped in the film during curing is decreased.

Figure 16:
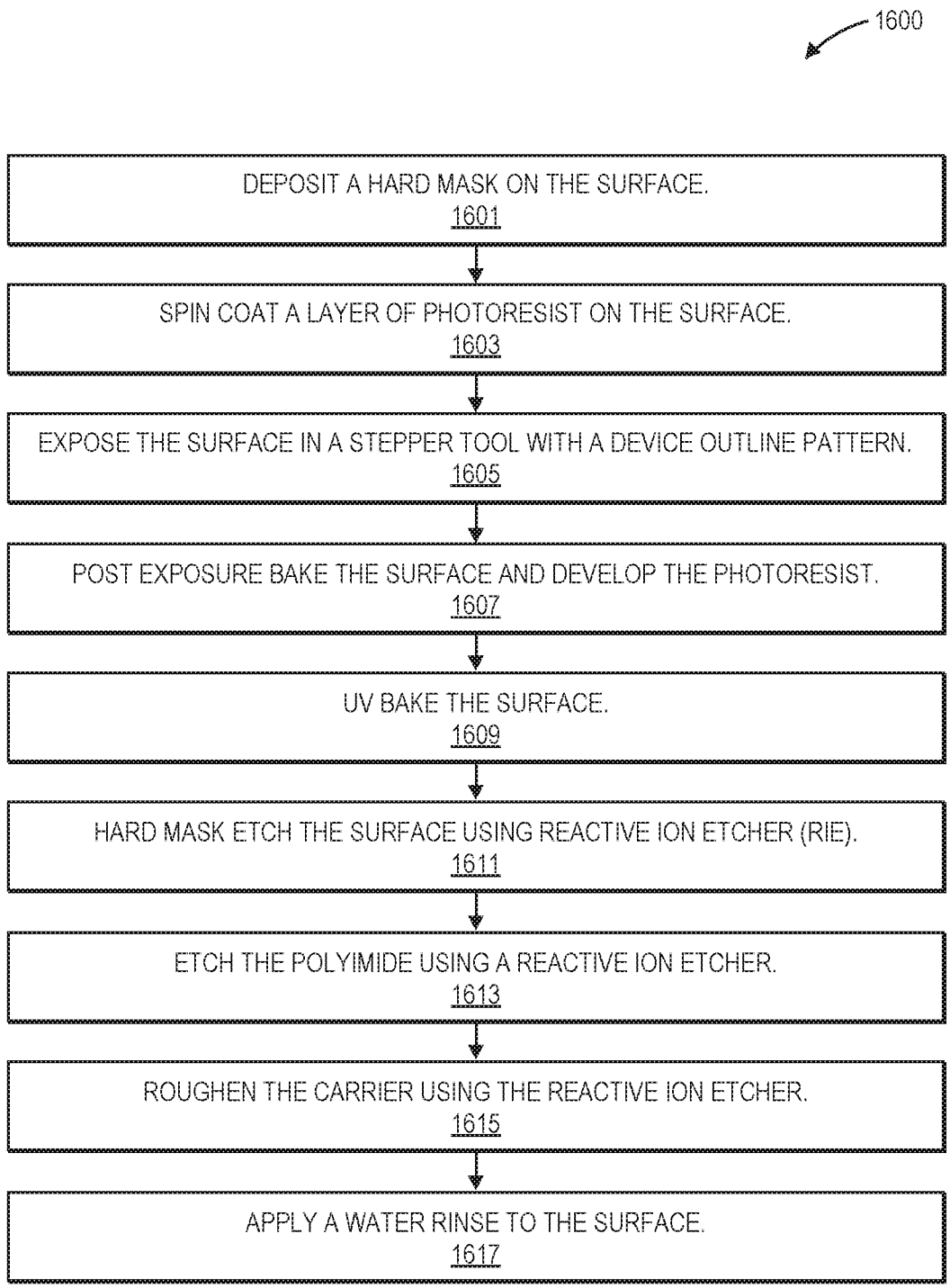
FIG. 16 is a flow chart illustrating an exemplary technique for patterning an outline for a device on a surface while fabricating electrode arrays, according to the present disclosure.

FIG. 16 illustrates an exemplary technique 1600 for patterning an outline for the device on the surface, related to step 1109. As illustrated in the figure, in an exemplary technique, patterning an outline for the device on the surface 1109 may include the steps of depositing a hard mask on the surface 1601, spin coating photoresist (e.g., approximately 420 nm of deep UV (DUV) photoresist) on the surface 1603, exposing the surface in a stepper tool with a device outline pattern 1605, post exposure baking the surface to develop the photoresist 1607, UV baking the surface 1609, hard mask etching the surface using reactive ion etcher 1611, etching the polyimide using a reactive ion etcher 1613, roughening the carrier using the reactive ion etcher 1615, and applying a water rinse to the surface 1617.

In some embodiments, one or more steps of the exemplary technique illustrated in the figure may be particular to a stepper lithography technique and allow for higher resolution features. In some embodiments, roughening the carrier using the reactive ion etcher 1615 may improve adhesion of the support layer to the carrier wafer, which may allow the wafer to be processed further without damaging devices.

Figure 17:
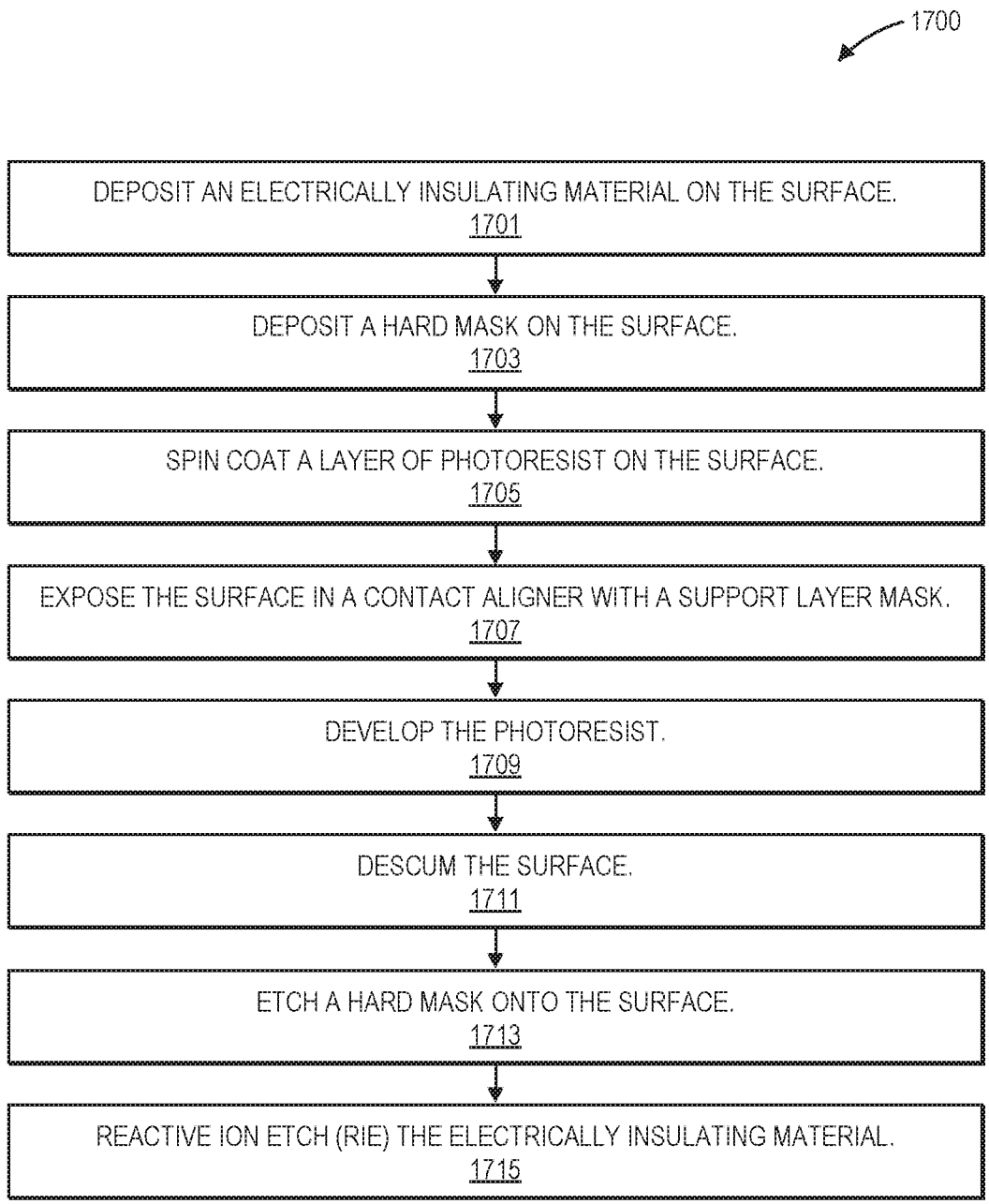
FIG. 17 is a flow chart illustrating an exemplary technique for constructing a thread support layer on a surface while fabricating electrode arrays, according to the present disclosure

FIG. 17 illustrates an exemplary technique 1700 for constructing a thread support layer on a surface, related to step 1111. As illustrated in the figure, in an exemplary technique, constructing the thread support layer on a surface 1111 may include the steps of depositing an electrically insulating material (e.g., approximately 6 μm of parylene-C) on the surface 1701, depositing a hard mask on the surface 1703, spin coating photoresist (e.g., approximately 2 μm of photoresist) on the surface 1705, exposing the surface in a contact aligner with a support layer mask 1707, developing the photoresist 1709, descumming the surface 1711, etching the hard mask onto the surface 1713, and reactive ion etching the electrically insulating materials (e.g., parylene-C) 1715. In some embodiments, the deposited hard mask 1703 may be configured (e.g., by choice of materials) to enable higher resolution in the thread support layer.

Figure 18:
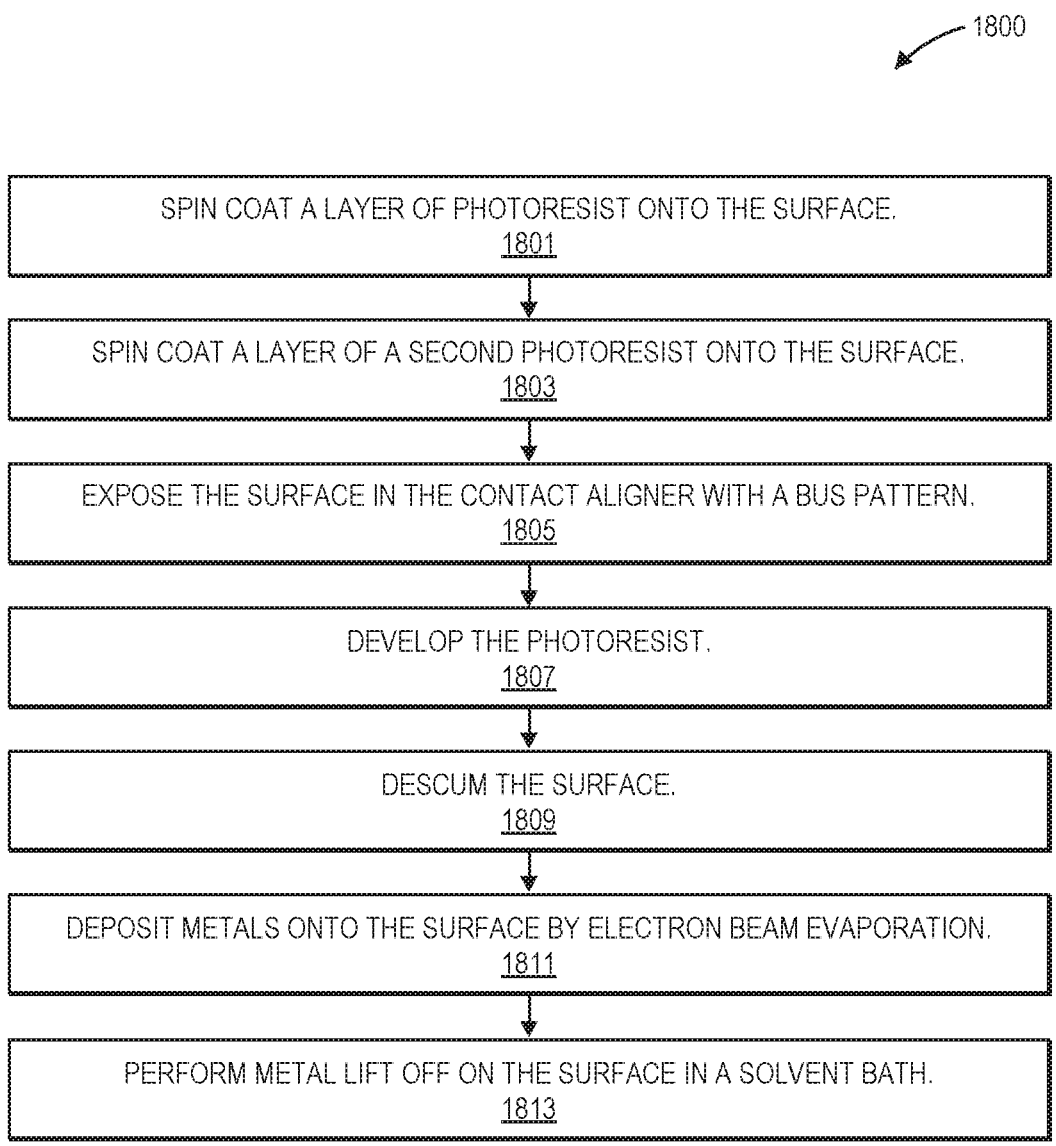
FIG. 18 is a flow chart illustrating an exemplary technique for electroplating a current bus on a surface while fabricating electrode arrays, according to the present disclosure.

FIG. 18 illustrates an exemplary technique 1800 for electroplating a current bus on a surface, related to step 1113. As illustrated in the figure, in an exemplary technique, electroplating the current bus of the surface 1113 may include the steps of spin coating a layer of photoresist (e.g., approximately 5.6 µm of g-line photoresist) onto the surface 1801, spin coating a second layer of photoresist (e.g., approximately 2.8 µm of i-line photoresist) onto the surface 1803, exposing the surface in the contact aligner with a bus pattern (e.g., copper) 1805, developing the photoresist 1807, descumming the surface 1809, depositing metals (e.g., approximately 10 nm of titanium and approximately 3 µm of copper) onto the surface by electron beam evaporation 1811, and performing metal lift off on the surface in a solvent bath 1813.

In some embodiments, by performing metal lift off on the surface in a solvent bath 1813, the disclosed fabrication techniques may improve resolution of the electrode arrays in comparison to electrode arrays fabricated using a wet etch process. In some embodiments, the metal lift off may allow connections in the vias of the electrode array to be located close to the bond pads, thereby reducing the space required by and the footprint of the electrode array.

Figure 19:
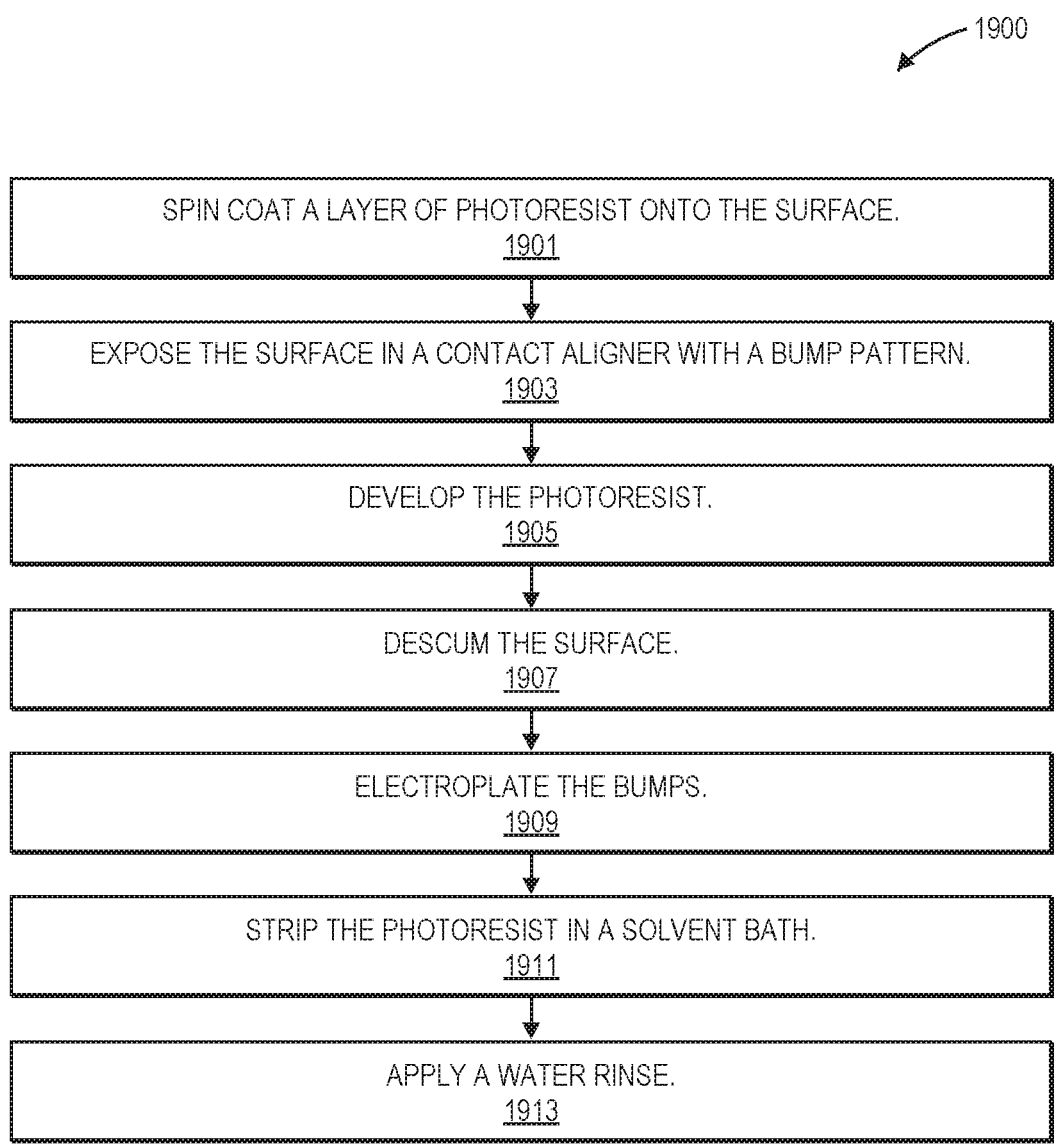
FIG. 19 is a flow chart illustrating an exemplary technique for electroplating electrical pads on a surface while fabricating electrode arrays, according to the present disclosure.

FIG. 19 illustrates an exemplary technique 1900 for electroplating the bond pads, related to step 1115. As illustrated in the figure, in an exemplary technique, electroplating the bond pads (e.g., nickel) on the surface 1115 may include the steps of spin coating a layer of photoresist (e.g. approximately 2 µm of photoresist) onto the surface 1901, exposing the surface in a contact aligner with a bumps pattern (e.g., nickel) 1903, developing the photoresist 1905, descumming the surface 1907, electroplating the bumps (e.g., 10-20 µm nickel bumps) 1909, stripping the photoresist in a solvent bath 1911, and applying a water rinse 1913.

Although the present disclosure may provide a sequence of steps, it is understood that in some embodiments, additional steps may be added, and described steps may be omitted, and are not limited by the present disclosure. Additionally, the described sequence of steps may be performed in any suitable order.

Although the present disclosure has provided a range of values, it is understood that each intervening value between the upper and lower limits of that range is also specifically disclosed.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

What is claimed is:

1. A flexible, thin film, compliant electrode apparatus, comprising:
   a biocompatible, compliant dielectric having a top edge defined by a top and a side along a length of the dielectric;
   electrical traces within the dielectric and oriented substantially along the length of the dielectric, a respective electrical trace of the electrical traces insulated from a second electrical trace of the electrical traces; and
   electrode contacts situated on the side along the length of the dielectric,
   wherein the electrical contacts are confined to a side edge along the length of the dielectric, and
   wherein an exposed portion of a respective electrode contact is entirely below the top edge of the dielectric and is beyond the side edge along the length of the dielectric, and wherein the respective electrode contact is coupled to the respective electrical trace,
   wherein a bottom of the exposed portion of the respective electrode contact is covered with a dielectric base.

2. The compliant electrode apparatus of claim 1, further comprising:
   a reference electrode configured to read a reference signal from a fluid in a biological tissue, the reference electrode connected with one of the electrical traces, wherein the reference electrode is communicatively coupled to a processor configured to read the reference signal.

3. The compliant electrode apparatus of claim 1, wherein the electrode contacts include between 20 and 50 electrode contacts spaced along the length of the dielectric by between 45 micrometers and 55 micrometers center-on-center spacing, and wherein an area of each electrode contact is less than 350 square micrometers.

4. The compliant electrode apparatus of claim 1, wherein the electrode contact has a substantially oval shape.

5. The compliant electrode apparatus of claim 1, wherein the dielectric comprises polyimide, and the electrical traces and the electrode contacts comprise gold or another metal.

6. The compliant electrode apparatus of claim 1, wherein the dielectric comprises one or more of:
   epoxy;
   polyparaxylylene;
   parylene; and
   acrylic.

7. The compliant electrode apparatus of claim 1, further comprising:
   an engagement component coupled to an end of the dielectric for detachably coupling to an insertion needle.

8. The compliant electrode apparatus of claim 1, wherein a thickness of the dielectric is between 4 micrometers and 8 micrometers, and wherein the length of the dielectric is between 15 millimeters and 25 millimeters.

9. The compliant electrode apparatus of claim 1, wherein the electrical contacts are implanted in a brain at a depth of approximately two millimeters.

10. The compliant electrode apparatus of claim 1, wherein the electrode contacts comprise gold treated with polyethylenedioxythiophene doped with polystyrene sulfonate (PEDOT:PSS).

11. The compliant electrode apparatus of claim 1, wherein the electrode contacts comprise gold electrode treated with iridium oxide.

12. The compliant electrode apparatus of claim 1, wherein the electrode contacts have rectangular cross-sections.

13. The compliant electrode apparatus of claim 1, wherein the compliant electrode apparatus is one of a plurality of compliant electrode apparatuses forming an array of more than 3,000 electrodes.

14. The compliant electrode apparatus of claim 1, wherein the compliant electrode apparatus is deposited onto parylene-c to form a film on which the electrode apparatus remains attached until removed for implantation.

15. The compliant electrode apparatus of claim 1, wherein the biocompatible compliant dielectric is a partial dielectric cover.

16. The compliant electrode apparatus of claim 15, wherein the respective electrode contact is below the top edge of the partial dielectric cover but entirely above a top edge of the dielectric base.

* * * * *